United States Patent
Kato et al.

(10) Patent No.: US 6,469,419 B2
(45) Date of Patent: Oct. 22, 2002

(54) ULTRASONIC MOTOR CAPABLE OF SENSING BOTH LONGITUDINAL AND TORSIONAL VIBRATIONS THEREOF AND METHOD FOR OPERATING THE SAME

(75) Inventors: Yukiyasu Kato, Iwata; Masahiko Komoda, Toyokawa; Motoyasu Yano, Kosai, all of (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/892,563

(22) Filed: Jun. 28, 2001

(65) Prior Publication Data

US 2002/0005682 A1 Jan. 17, 2002

(30) Foreign Application Priority Data

Jul. 14, 2000 (JP) ........................................ 2000-214376
Dec. 22, 2000 (JP) ........................................ 2000-391327

(51) Int. Cl.[7] ............................................. H01L 41/08
(52) U.S. Cl. ............................ 310/323.02; 310/323.12; 310/316.01; 310/325
(58) Field of Search ....................... 310/316.01, 316.02, 310/323.02, 325

(56) References Cited

U.S. PATENT DOCUMENTS

| | | | | |
|---|---|---|---|---|
| 4,812,697 A | * | 3/1989 | Mishiro | 310/323.02 |
| 5,231,325 A | * | 7/1993 | Tamai et al. | 310/323.02 X |
| 5,233,274 A | * | 8/1993 | Honda et al. | 318/116 |
| 6,037,701 A | * | 3/2000 | Atsuta | 310/316.01 |
| 6,084,335 A | * | 7/2000 | Tamai | 310/316.02 |
| 6,177,753 B1 | * | 1/2001 | Atsuta | 310/316.01 |

FOREIGN PATENT DOCUMENTS

JP     B2-2915139     4/1999

* cited by examiner

*Primary Examiner*—Mark O. Budd
(74) *Attorney, Agent, or Firm*—Law Offices of David G. Posz

(57) ABSTRACT

A stator includes a longitudinal-vibration sensing electrode. The stator also includes a torsional-vibration sensing piezoelectric element and a torsional-vibration sensing electrode plate for sensing torsional vibrations. A voltage signal from the torsional-vibration sensing electrode plate or a voltage signal from the longitudinal-vibration sensing electrode is sensed. Then, a drive voltage signal for driving the stator is generated in a self-excited oscillation drive circuit in such a manner that an actual vibrational frequency of the stator substantially coincides with a resonance frequency. Thereafter, the generated drive voltage signal is applied between a drive electrode and each one of first and second electrode plates.

14 Claims, 14 Drawing Sheets

ULTRASONIC MOTOR CAPABLE OF SENSING BOTH LONGITUDINAL AND TORSIONAL VIBRATIONS THEREOF AND METHOD FOR OPERATING THE SAME

CROSS REFERENCE TO RELATED APPLICATION

This application is based on and incorporates herein by reference Japanese Patent Application No. 2000-214376 filed on Jul. 14, 2000 and Japanese Patent Application No. 2000-391327 filed on Dec. 22, 2000.

BACKGROUND OF THE INVENTION

1. Field of the Invention

The present invention relates to an ultrasonic motor and a method for operating the ultrasonic motor.

2. Description of Related Art

One example of a previously proposed ultrasonic motor is a standing-wave type ultrasonic motor, such as shown in FIGS. 16 and 17. This type of ultrasonic motor includes a rotor 101 and a stator 102. The stator 102 includes metal blocks 104, 105, piezoelectric elements 106, 107, drive electrode plate 108, longitudinal-vibration sensing electrode plate 109 and common electrode plates 110, 111, which are all connected and fastened together by a single bolt 112. With reference to FIG. 16, the drive electrode plate 108 and the longitudinal-vibration sensing electrode plate 109 are integrated in a single disk and are electrically insulated from each other.

With reference to FIG. 17, a portion of the bolt 112 that protrudes from a top surface of the stator 102 (metal block 104) is received within the rotor 101, and a nut 113 is tightened onto the bolt 112 to tightly connect the rotor 101 and the stator 102 together.

The ultrasonic motor is rotated both forward and backward by a drive control circuit 119. With reference to FIG. 17, the drive control circuit 119 includes a rotational direction selection circuit 120, a frequency variable oscillation circuit 121 and a power amplifier 122. The rotational direction selection circuit 120 outputs a forward rotational signal s1 and a backward rotational signal s2 to the frequency variable oscillation circuit 121 when the ultrasonic motor is rotated forward and backward, respectively. The frequency variable oscillation circuit 121 generates a signal SGf1 having a resonance frequency f1 (or a signal SGf2 having a resonance frequency f2) for rotating the ultrasonic motor forward (or backward) based on the forward rotational signal s1 (or backward rotational signal s2) outputted from the rotational direction selection circuit 120 and then outputs it to the power amplifier 122. The power amplifier 122 amplifies the signal SGf1 having the frequency f1 (or the signal SGf2 having the frequency f2) and applies it between the drive electrode plate 108 and each one of the common electrode plates 110, 111.

Then, the ultrasonic motor is rotated forward with the high frequency voltage that has the resonance frequency f1 and that has been amplified through the power amplifier 122. Vibrations of the stator 102 generated during the forward rotation of the ultrasonic motor are complex vibrations that include torsional vibrations (mainly secondary torsional vibrations) as a major component and additionally include longitudinal vibrations as a minor component. Also, the ultrasonic motor is rotated backward with the high frequency voltage that has the resonance frequency f2 and that has been amplified through the power amplifier 122. Vibrations of the stator 102 generated during the backward rotation of the ultrasonic motor are complex vibrations that include longitudinal vibrations (mainly primary longitudinal vibrations) as a major component and additionally include torsional vibrations as a minor component.

A change in an ambient temperature or a load applied to the ultrasonic motor may cause the ultrasonic motor (stator 102) to vibrate at a frequency other than the resonance frequency f1 although the high frequency voltage having the resonance frequency f1 for the forward rotation is applied to the ultrasonic motor from the power amplifier 122. This results in reduced rotational efficiency of the ultrasonic motor. The same thing happens when the ultrasonic motor is rotated backward upon application of the high frequency voltage having the resonance frequency f2 for the backward rotation to the ultrasonic motor.

In order to vibrate the ultrasonic motor at the resonance frequency f1 (or resonance frequency f2) regardless of the change in the ambient temperature or the load, the frequency of the high frequency voltage to be applied between the drive electrode plate 108 and each one of the common electrode plates 110, 111 is controlled. More specifically, the drive control circuit 119 includes a vibration comparator circuit 130 and a frequency control circuit 131.

The vibration comparator circuit 130 receives a signal indicative of a current vibrational state of the stator 102 from a longitudinal-vibration sensing electrode plate 109 and thereby obtains a vibrational frequency (actual vibrational frequency) of the stator 102. The vibration comparator circuit 130 compares the actual vibrational frequency with the resonance frequency f1 (or the resonance frequency f2 in the case of the backward rotation) and outputs this comparison result to the frequency control circuit 131.

The frequency control circuit 131 computes a required control amount to shift the actual vibrational frequency of the stator 102 to the resonance frequency f1 (or the resonance frequency f2 in the case of the backward rotation) based on the comparison result and outputs the computed control amount to the frequency variable oscillation circuit 121. The frequency variable oscillation circuit 121 shifts the frequency of the signal SGf1 (or the signal SGf2) in such a manner that the actual vibrational frequency of the stator 102 substantially coincides with the resonance frequency f1 (or the resonance frequency f2 in the case of the backward rotation) based on the control amount outputted from the frequency control circuit 131 and outputs it to the power amplifier 122.

Thus, even though the ambient temperature or the load changes, the ultrasonic motor can vibrate at the resonance frequency f1 (or the resonance frequency f2 in the case of the backward rotation), so that the ultrasonic motor can be rotated effectively.

However, the vibrations of the stator 102 are complex vibrations comprising the longitudinal vibrations and the torsional vibrations. A vibrational pattern of the longitudinal vibrations is different from a vibrational pattern of the torsional vibrations. Thus, it is difficult to accurately sense the vibrational pattern of each one of the longitudinal and torsional vibrations with the single longitudinal-vibration sensing electrode plate 109. Furthermore, the previously proposed ultrasonic motor uses the vibration comparator circuit 130 and the frequency control circuit 131 which are rather complex and expensive, resulting in an increase in a manufacturing cost of the ultrasonic motor.

SUMMARY OF THE INVENTION

Thus, it is an objective of the present invention to provide an ultrasonic motor that can optimize its operating conditions and that allows a reduction in a manufacturing cost of the ultrasonic motor. It is another objective of the present invention to provide a method for operating such an ultrasonic motor.

To achieve the objectives of the present invention, there is provided an ultrasonic motor including a rotor and a stator. The stator generates complex vibrations for rotating the rotor. The complex vibrations include longitudinal vibrations and torsional vibrations. The rotor is rotatably urged against the stator. The stator includes a plurality of piezoelectric drive elements, a plurality of power supply electrode plates for supplying power to the piezoelectric drive elements, a longitudinal-vibration sensing means for sensing the longitudinal vibrations, a first metal block, a second metal block and a torsional-vibration sensing means for sensing the torsional vibrations. The piezoelectric drive elements, the power supply electrode plates and the longitudinal-vibration sensing means are securely clamped between the first metal block and the second metal block. The torsional-vibration sensing means is provided separately from the piezoelectric drive elements and the power supply electrode plates.

There is also provided a method for operating an ultrasonic motor including a stator and a rotor. The stator generates complex vibrations for rotating the rotor. The complex vibrations include longitudinal vibrations and torsional vibrations. The stator includes a plurality of piezoelectric drive elements, a plurality of power supply electrode plates for supplying power to the piezoelectric drive elements, a longitudinal-vibration sensing means for sensing the longitudinal vibrations, a first metal block and a second metal block. The piezoelectric drive elements, the power supply electrode plates and the longitudinal-vibration sensing means are securely clamped between the first metal block and the second metal block. The rotor is rotatably urged against the stator. The method includes steps of sensing voltage signals through the longitudinal-vibration sensing means and also through a torsional-vibration sensing means provided in the stator for sensing the torsional vibrations, generating a drive voltage signal for driving the stator based on the voltage signal in such a manner that an actual vibrational frequency of the stator substantially coincides with a resonance frequency of the stator, and applying the drive voltage signal to the power supply electrode plates.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

A standing-wave type ultrasonic motor according to one embodiment of the present invention will be described with reference to the accompanying drawings.

Figure 1:
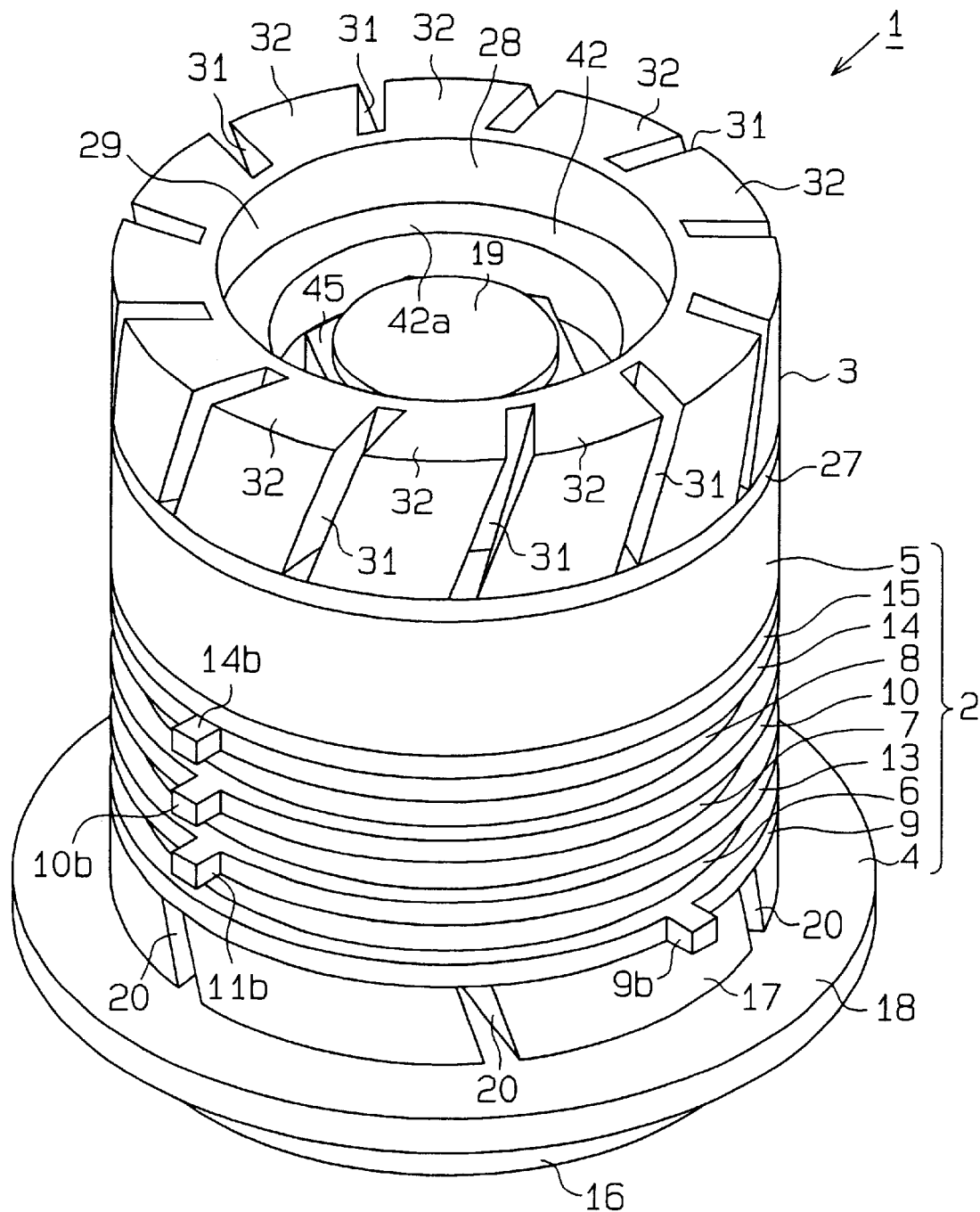
FIG. 1 is a perspective view of an ultrasonic motor according to one embodiment of the present invention.
Figure 2:
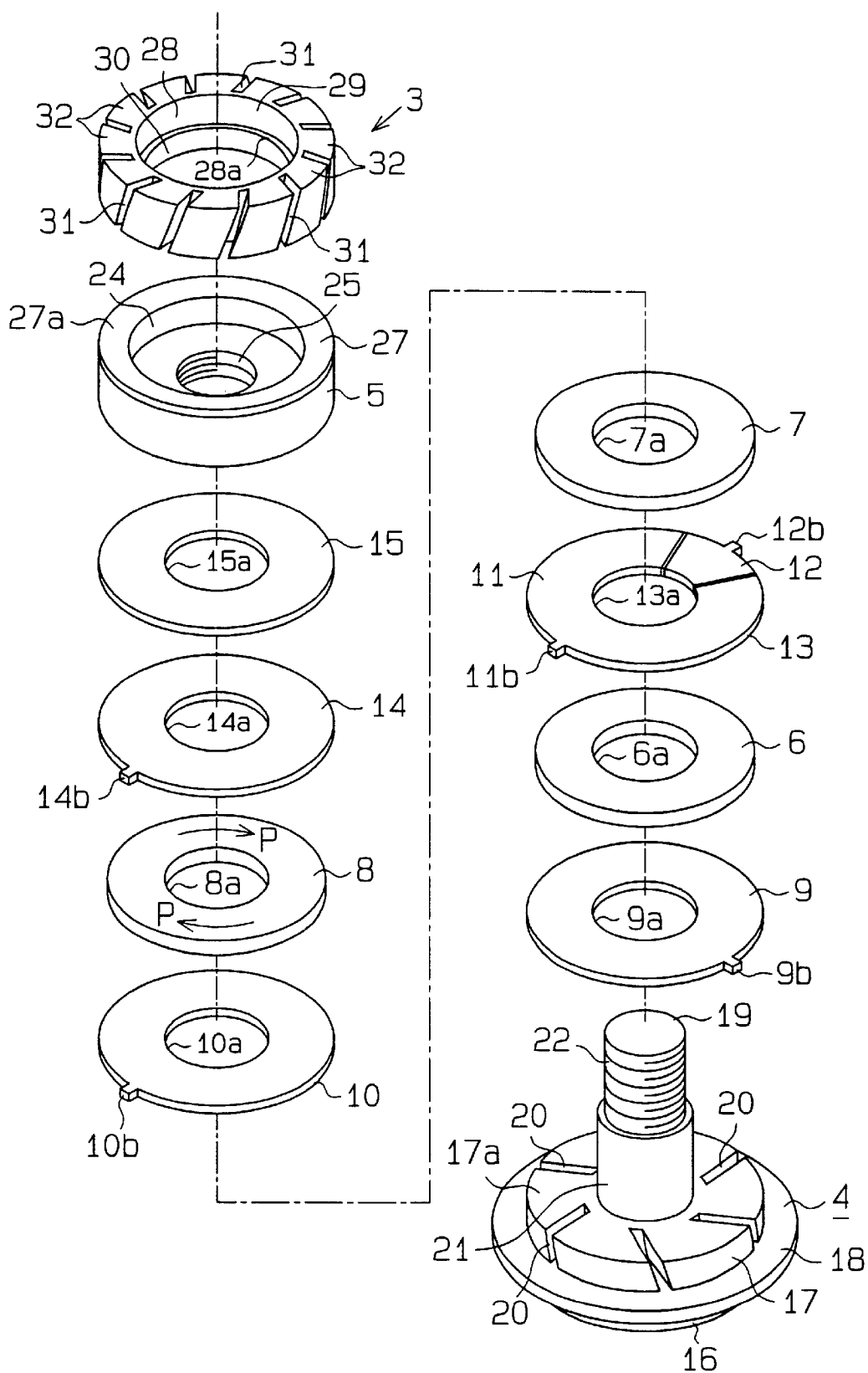
FIG. 2 is an exploded perspective view of the ultrasonic motor according to the embodiment.
Figure 3:
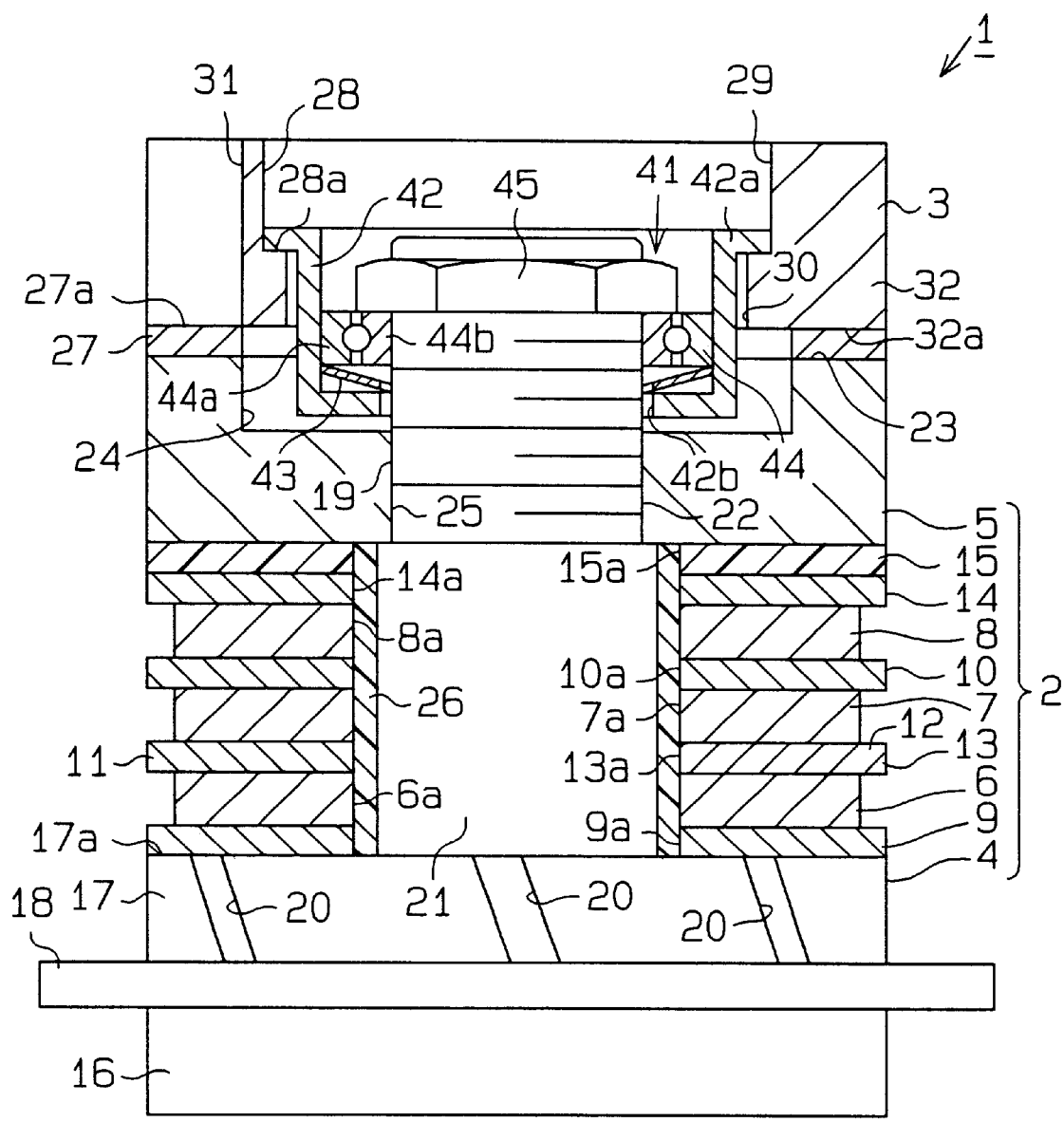
FIG. 3 is a schematic longitudinal cross-sectional view of the ultrasonic motor according to the embodiment.

With reference to FIGS. 1 to 3, the ultrasonic motor 1 includes a stator 2 and a rotor 3. The stator 2 includes first and second metal blocks 4, 5, first and second piezoelectric drive elements 6, 7, a torsional-vibration sensing piezoelectric element 8, first and second electrode plates 9, 10, a third electrode 13, a torsional-vibration sensing electrode plate 14 and a dielectric plate 15. The torsional-vibration sensing piezoelectric element 8 constitutes a torsional-vibration sensing means. The first and second electrode plates 9, 10 act as power supply electrode plates. The third electrode plate 13 includes a drive electrode 11 and a longitudinal-vibration sensing electrode 12 that acts as a longitudinal-vibration sensing means. The torsional-vibration sensing electrode plate 14 also constitutes the torsional-vibration sensing means. The first and second piezoelectric drive elements 6, 7 generate vibrations to rotate the rotor 3 and also act as the longitudinal-vibration sensing piezoelectric elements that also constitute the longitudinal-vibration sensing means.

The first metal block 4 is an integral body made of an electrically conductive aluminum alloy. Furthermore, the first metal block 4 includes first and second block portions 16, 17, a flange 18 and a bolt 19.

The second block portion 17 has a plurality (six in this embodiment) of obliquely extending stator slits 20 on its outer peripheral surface. The bolt 19 protrudes from a center of a top surface 17a of the second block portion 17. The bolt 19 includes a shaft portion 21 and a threaded portion 22. The threaded portion 22 is arranged distal to the shaft portion 21 and has a reduced diameter. Threads are formed in an outer peripheral surface of the threaded portion 22.

The second metal block 5 is made of an electrically conductive aluminum alloy and has a recess 24 that is formed in a center of a top end surface 23 of the second metal block 5. A bolt engaging hole 25 axially penetrates through the second metal block 5 at a center of a base of the recess 24.

Each one of the first and second piezoelectric elements 6, 7 is disk shaped and has a through hole 6a, 7a penetrating through its center. Furthermore, each one of the first and second piezoelectric elements 6, 7 is polarized in a thickness direction thereof or an axial direction of the ultrasonic motor (vertical direction in FIG. 2).

The torsional-vibration sensing piezoelectric element 8 is disk shaped and has a through hole 8a penetrating through its center. The torsional-vibration sensing piezoelectric element 8 is polarized in a torsional direction about a rotational axis of the ultrasonic motor (a circumferential direction indicated with an arrow P in FIG. 2).

Each one of the first and second electrode plates 9, 10 is disk shaped and has a through hole 9a, 10a penetrating through its center. A terminal piece 9b, 10b is formed in a peripheral surface of each one of the first and second electrodes 9, 10. A predetermined high frequency alternating voltage is applied between the terminal piece 9b and the terminal piece 10b.

Figure 4:
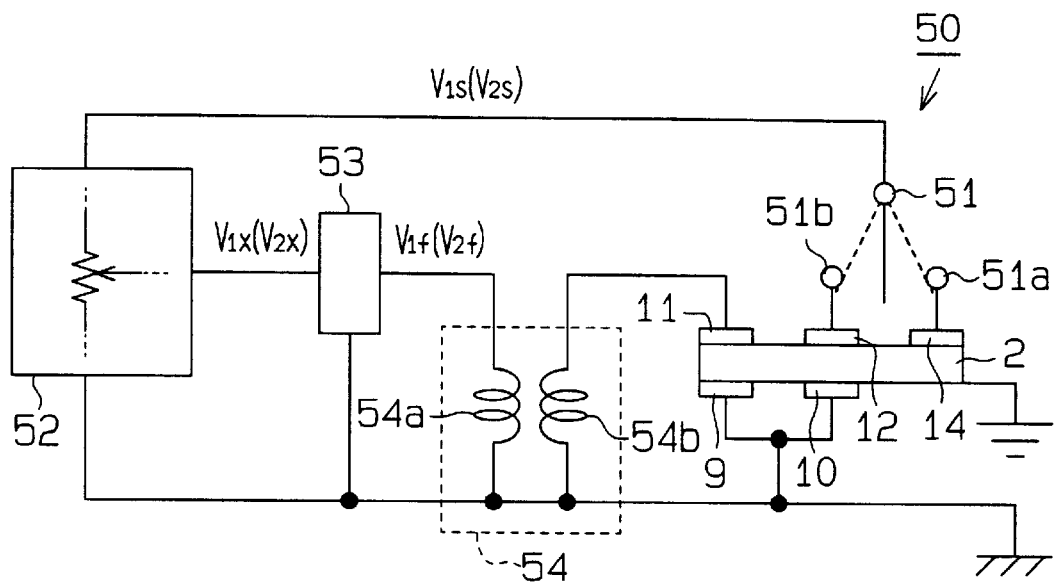
FIG. 4 is a circuit diagram showing a drive circuit for driving the ultrasonic motor according to the embodiment.

The third electrode plate 13 is disk shaped and includes the drive electrode 11 and the longitudinal-vibration sensing electrode 12. The third electrode plate 13 has a through hole 13a penetrating through its center. The drive electrode 11 and the longitudinal-vibration sensing electrode 12 are electrically insulated from each other. A terminal piece 11b and a terminal piece 12b are provided in an outer peripheral surface of the third electrode plate 13. The terminal piece 11b is electrically connected to the drive electrode 11. The terminal piece 12b is electrically connected to the longitudinal-vibration sensing electrode 12. The terminal piece 11b and the terminal piece 12b are connected to a self-excited oscillation drive circuit 50 acting as a drive circuit, which is shown in FIG. 4 and will be described in greater details hereinafter, through lead wires.

The torsional-vibration sensing electrode plate 14 is disk shaped and has a through hole 14a penetrating through its center. A terminal piece 14b is formed in an outer peripheral surface of the torsional-vibration sensing electrode plate 14. The terminal piece 14b is connected to the self-excited oscillation drive circuit 50 through a lead wire. The dielectric plate 15 is disk shaped and is made of a dielectric material, such as a resin material. The dielectric plate 15 has a through hole 15a that penetrates through its center.

The first and second piezoelectric drive elements 6, 7, the torsional-vibration sensing piezoelectric element 8, the first and second electrode plates 9, 10, the third electrode plate 13, the torsional-vibration sensing electrode plate 14 and the dielectric plate 15 are arranged between the first metal block 4 and the second metal block 5. More specifically, the first electrode plate 9, the first piezoelectric drive element 6, the third electrode plate 13, the second piezoelectric drive element 7, the second electrode plate 10, the torsional-vibration sensing piezoelectric element 8, the torsional-vibration sensing electrode plate 14 and the dielectric plate 15 are stacked in this order between a top surface of the first metal block 4 and a bottom surface of the second metal block 5.

With reference to FIG. 3, the first metal block 4 and the second metal block 5 are fastened together by threadably engaging the threaded portion 22 of the bolt 19 into the bolt fastening hole 25 of the second metal block 5 while the first and second piezoelectric drive elements 6, 7, the torsional-vibration sensing piezoelectric element 8, the first and second electrode plates 9, 10, the third electrode plate 13, the torsional-vibration sensing electrode plate 14 and the dielectric plate 15 are stacked in the described order and are held between the first metal block 4 and the second metal block 5.

With reference to FIG. 3, a cylindrical dielectric collar 26 is inserted through the through holes 6a–14a of the first and second piezoelectric drive elements 6, 7, the torsional-vibration sensing piezoelectric element 8, the first and second electrode plates 9, 10, the third electrode plate 13, the torsional-vibration sensing electrode plate 14 and the dielectric plate 15. The bolt 19 is received within the collar 26.

The first and second piezoelectric drive elements 6, 7, the torsional-vibration sensing piezoelectric element 8, the first and second electrode plates 9, 10, the third electrode plate 13, the torsional-vibration sensing electrode plate 14 and the dielectric plate 15 are electrically insulated from the bolt 19.

An annular lining material 27 is adhered to the top end surface 23 of the second metal block 5. The rotor 3 is coaxially held on a top surface 27a of the lining material 27.

A shaft center hole 28 axially penetrates through the center of the rotor 3. The shaft center hole 28 has a first shaft center hole 29 and a second shaft center hole 30 located below the first shaft center hole 29. The second shaft center hole 30 has a reduced diameter in comparison to the first shaft center hole 29 and is separated from the first shaft center hole 29 by a step portion 28a.

With reference to FIG. 2, a plurality (twelve in this embodiment) of rotor slits 31 are obliquely arranged in an outer peripheral surface of the rotor 3. Fan shaped protrusions 32 are arranged between adjacent rotor slits 31. Each fan shaped protrusion 32 has an increasing circumferential width that increases toward its radially outer end. A contact surface 32a is formed between each protrusion 32 and the lining material 27 when the rotor 3 is held on the lining material 27.

With reference to FIG. 3, the rotor 3 is urged against the stator 2 (the top surface 27a of the lining material 27) by an urging mechanism 41. The urging mechanism 41 includes a receiving cup 42, a Belleville spring 43, a ball bearing 44 and a nut 45.

The receiving cup 42 is secured to the shaft center hole 28 of the rotor 3. The receiving cup 42 is generally cylindrically shaped and has a bottom portion. The receiving cup 42 has an outer diameter that is slightly smaller than an inner diameter of the second shaft center hole 30. A flange 42a is formed at an upper opening end of the receiving cup 42 and protrudes radially outward. The flange 42a has an outer diameter that is substantially the same as an inner diameter of the first shaft center hole 29. A through hole 42b penetrates through a center of the bottom portion of the receiving cup 42. The through hole 42b has an inner diameter slightly larger than an outer diameter of the bolt 19 (threaded portion 22). The receiving cup 42 is secured to the rotor 3 upon insertion of the bolt 19 (threaded portion 22) within the through hole 42b and placement of the flange 42a within the first shaft center hole 29 at the step portion 28a.

The Belleville spring 43 is received within the receiving cup 42. The bolt (threaded portion 22) 19 penetrates through a center hole 43a of the Belleville spring 43. An annular bottom portion of the Belleville spring 43 engages the bottom portion of the receiving cup 42.

The nut 45 is threadably inserted over the threaded portion 22 of the bolt 19 until it reaches a predetermined position adjacent to the ball bearing 44. An inner ring 44b of the ball bearing 44 is urged downward by the nut 45. In this way, the Belleville spring 43 is urged downward by an outer ring 44a of the ball bearing 44, so that the Belleville spring 43 is axially compressed. The bottom portion of the receiving cup 42 is urged downward by the Belleville spring 43, and the rotor 3 (protrusions 32) is urged against the top surface of the stator 2 (top surface 27a of the lining material 27). Furthermore, at this state, the rotor 3 is supported by the ball bearing 44 in a rotatable manner with respect to the bolt 19 (stator 2).

Figure 6A:
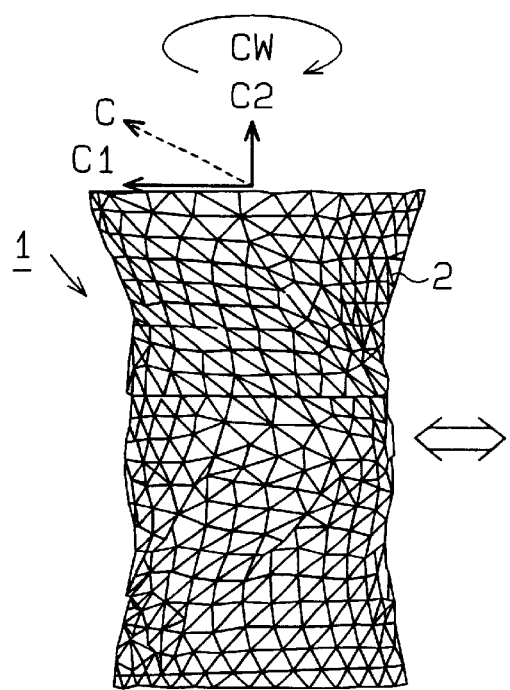
FIGS. 6A and 6B are schematic views showing contours of the vibrating ultrasonic motor during a forward rotation of the ultrasonic motor.
Figure 6B:
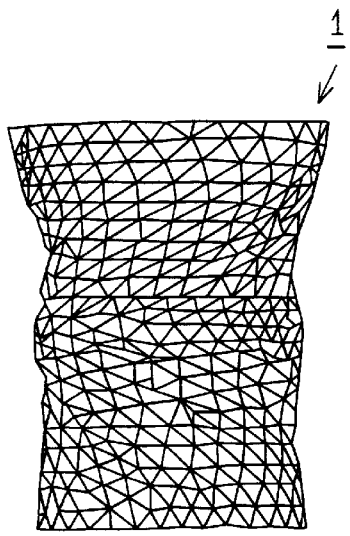
Figure 7A:
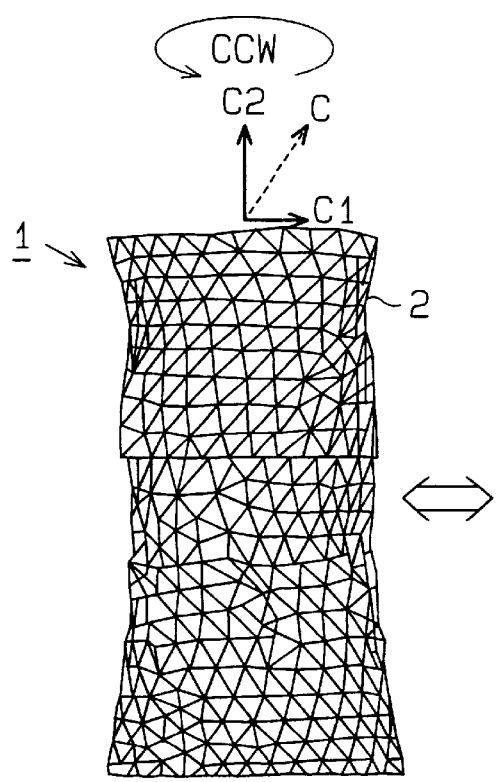
FIGS. 7A and 7B are schematic views showing contours of the vibrating ultrasonic motor during a backward rotation of the ultrasonic motor.
Figure 7B:
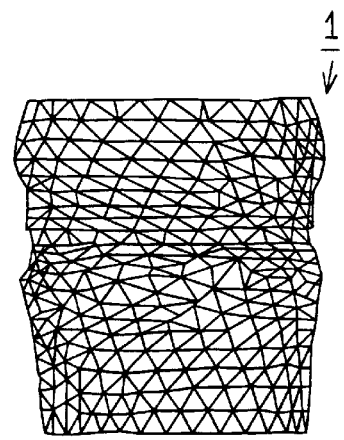
Figure 8:
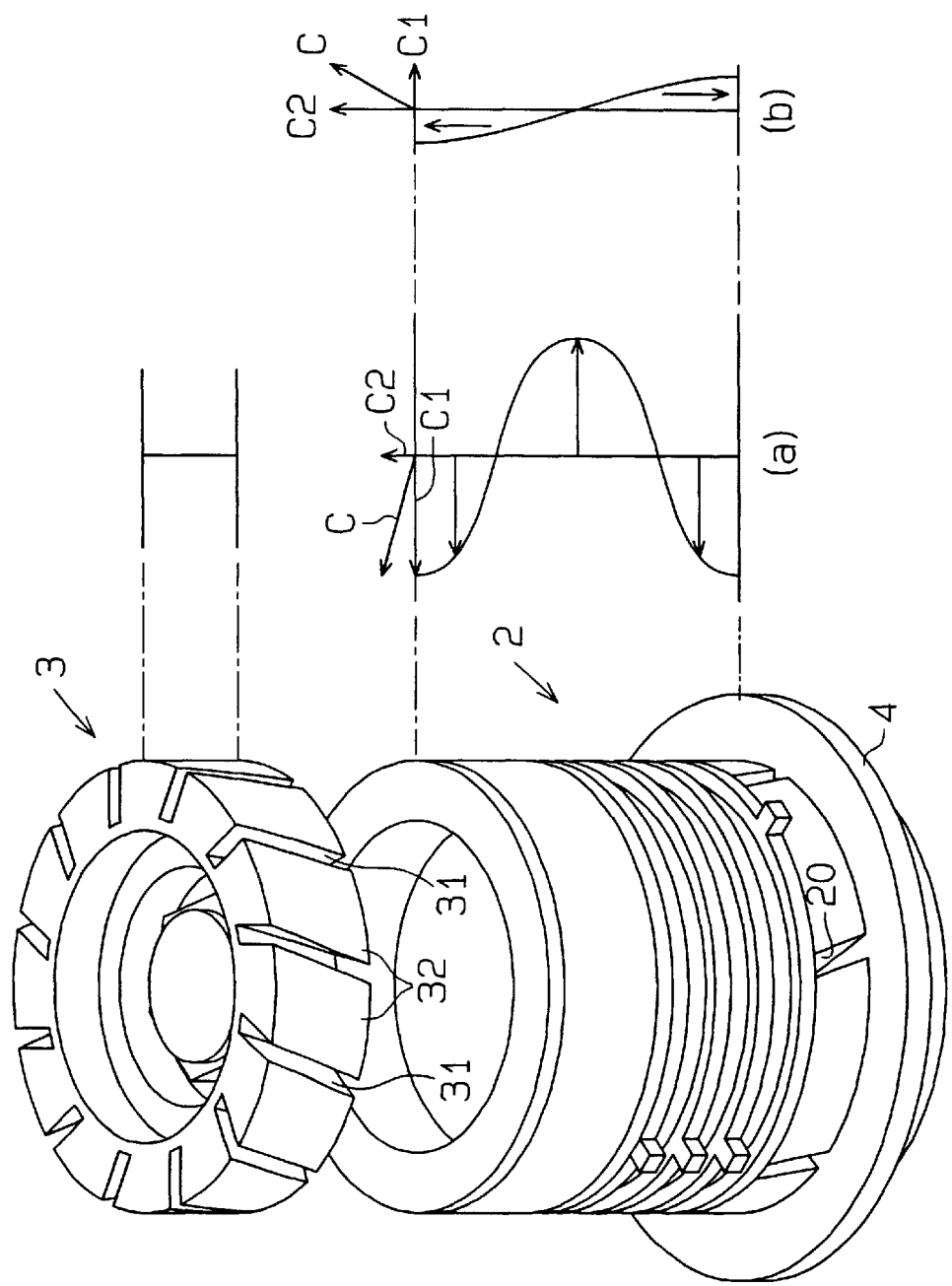
FIG. 8 is a schematic view for describing vibrations of the ultrasonic motor according to the embodiment.

When the high frequency voltage is applied between the drive electrode 11 and each one of the first and second electrode plates 9, 10 of the ultrasonic motor 1, the first and second piezoelectric drive elements 6, 7 vibrate. The vibrations of the first and second piezoelectric drive elements 6, 7 are conducted to the second metal block 5 through the torsional-vibration sensing piezoelectric element 8, the torsional-vibration sensing electrode plate 14 and the dielectric plate 15. FIGS. 6A to 7B are schematic views showing contours of the vibrating ultrasonic motor, which are reproduced with the aid of a finite element method (FEM). FIG. 8 is a schematic view for describing vibrations of the ultrasonic motor. When the ultrasonic motor 1 is rotated forward in a clockwise direction (CW) in FIG. 6A, the vibrations of the stator 2 (the vibrations of the top surface of the metal block 5) are complex vibrations (C) including the torsional vibrations (mainly secondary torsional vibrations) (C1) as a major component and also including the longitudinal vibrations (C2) as a minor component, as shown in FIG. 6A and a graph depicted with "(a)" in FIG. 8. When the ultrasonic motor 1 is rotated backward in a counterclockwise direction (CCW) in FIG. 7A, the vibrations of the stator 2 (the vibrations of the top surface of the metal block 5) are complex vibrations (C) including the longitudinal vibrations (mainly the primary longitudinal vibrations) (C2) as a major component and also including the torsional vibrations (C1) as a minor component, as shown in FIG. 7A and a graph depicted with "(b)" in FIG. 8.

With reference to FIG. 4, the self-excited oscillation drive circuit 50 acting as the drive circuit for driving the ultrasonic motor 1 will now be described in greater details.

The self-excited oscillation drive circuit 50 of the present embodiment includes a switch 51, a voltage signal generation circuit 52, a frequency variable oscillation circuit 53 and a transformer 54.

With reference to FIG. 4, the switch 51 includes a first switch terminal 51a and a second switch terminal 51b. The first switch terminal 51a is connected to the torsional-vibration sensing electrode plate 14. The second switch terminal 51b is connected to the longitudinal-vibration sensing electrode 12. In the present embodiment, the switch 51 is switched to the first switch terminal 51a when the ultrasonic motor 1 is rotated forward. The switch 51 is switched to the second switch terminal 51b when the ultrasonic motor 1 is rotated backward. When the ultrasonic motor 1 is rotated forward, a voltage signal V1s generated in the torsional-vibration sensing electrode plate 14 is outputted to the voltage signal generation circuit 52 through the switch 51. When the ultrasonic motor 1 is rotated backward, a voltage signal V2s generated in the longitudinal-vibration sensing electrode plate 12 is outputted to the voltage signal generation circuit 52 through the switch 51.

An output terminal of the voltage signal generation circuit 52 is connected to the frequency variable oscillation circuit 53. The voltage signal generation circuit 52 of the present embodiment generates a variable voltage signal V1x (or V2x in the case of the backward rotation) based on the voltage signal V1s from the torsional-vibration sensing electrode 14 (or V2s from the longitudinal-vibration sensing electrode 12 in the case of the backward rotation) and outputs it to the frequency variable oscillation circuit 53. Also, in the present embodiment, at startup of the ultrasonic motor 1 immediately after turning on the ultrasonic motor 1, more specifically, when the voltage signal V1s (or V2s) is zero after turning on the ultrasonic motor 1, the voltage signal generation circuit 52 generates a voltage signal V1xa (or V2xa in the case of the backward rotation of the motor) and outputs it to the frequency variable oscillation circuit 53.

An input terminal of the frequency variable oscillation circuit 53 is connected to the voltage signal generating circuit 52. An output terminal of the frequency variable oscillation circuit 53 is connected to a primary winding 54a of the transformer 54.

The frequency variable oscillation circuit 53 of the present embodiment generates a voltage signal V1f (or V2f in the case of backward rotation of the motor) as a drive voltage signal having a variable frequency f1x (or f2x in the case of the backward rotation of the motor) based on the voltage signal V1x (or V2x) outputted from the voltage signal generation circuit 52. Then, the frequency variable oscillation circuit 53 outputs the voltage signal V1f (or V2f) to the transformer 54.

Figure 5:
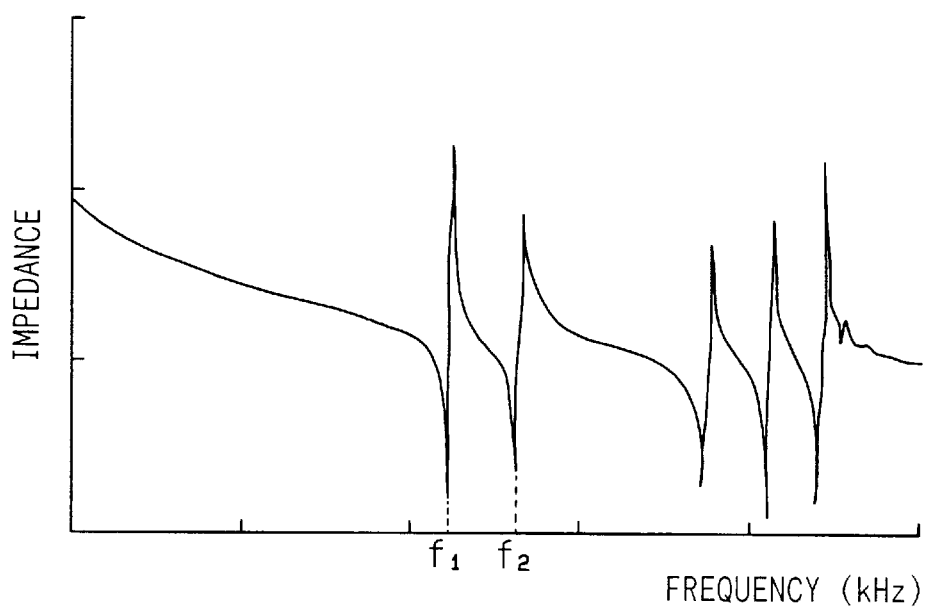
FIG. 5 is a graph showing characteristics of resonance vibrations in a stator of the ultrasonic motor according to the embodiment.

When the frequency variable oscillation circuit 53 receives the voltage signal V1x equal to "V1xa" from the voltage signal generation circuit 52, it outputs the voltage signal V1f having the frequency f1x equal to "f1". When the frequency variable oscillation circuit 53 receives the voltage signal V2x equal to "V2xa" from the voltage signal generation circuit 52, it outputs the voltage signal V2f having the frequency f2x equal to "f2". With reference to FIG. 5, the frequency f1 is the resonance frequency of the stator 2 during the forward rotation of the ultrasonic motor 1, and the frequency f2 is the resonance frequency of the stator 2 during the backward rotation of the ultrasonic motor 1.

The primary winding 54a of the transformer 54 is connected to the frequency variable oscillation circuit 53, and a secondary winding 54b of the transformer 54 is connected to the drive electrode 11, the first electrode plate 9 and the second electrode plate 10. The transformer 54 of the present embodiment amplifies the voltage signal V1f (or V2f) outputted from the frequency variable oscillation circuit 53 and applies it between the drive electrode 11 and each one of the first and second electrode plates 9, 10.

A method for operating the ultrasonic motor 1 of the present embodiment with the self-excited oscillation drive circuit 50 will now be described.

First, when the ultrasonic motor 1 is rotated forward, the switch 51 is switched to the first switch terminal 51a. At the startup of the ultrasonic motor 1 immediately after turning on the ultrasonic motor 1, the voltage signal generation circuit 52 generates the voltage signal V1x (=V1xa) based on the fact that the voltage signal V1s is zero and then outputs it to the frequency variable oscillation circuit 53.

Then, the frequency variable oscillation circuit 53 generates the voltage signal V1f having the frequency equal to the resonance frequency f1 based on the voltage signal V1x (=V1xa) outputted from the voltage signal generation circuit 52. The voltage signal V1f is boosted through the transformer 54 and is then applied between the drive electrode 11 and each one of the first and second electrodes 9, 10. Thereafter, the rotor 3, which is urged against the top surface of the metal block 5, is rotated forward in the clockwise direction (CW) in FIG. 6A by the complex vibrations mainly composed of the secondary torsional vibrations.

Once the ultrasonic motor 1 begins to rotate forward due to the vibrations of the stator 2, the voltage signal V1s is generated in the torsional-vibration sensing piezoelectric element 8 that is vibrated along with the stator 2. The voltage signal V1s is inputted to the voltage signal generation circuit 52. The voltage signal generation circuit 52 generates the voltage signal V1x for driving the stator 2 based on the voltage signal V1s outputted from the torsional-vibration sensing electrode plate 14 in such a manner that the actual vibrational frequency fn of the stator 2 substantially coincides with the resonance frequency f1. Then, the voltage signal generation circuit 52 outputs the generated voltage signal V1x to the frequency variable oscillation circuit 53.

The frequency variable oscillation circuit 53 generates the voltage signal V1f having the frequency fix based on the voltage signal V1x outputted from the voltage signal generation circuit 52 in such a manner that the actual vibrational frequency fn of the stator 2 substantially coincides with the resonance frequency f1. Then, the frequency variable oscillation circuit 53 outputs the generated voltage signal V1f to the transformer 54.

Thereafter, the transformer 54 boosts the voltage signal V1f outputted from the frequency variable oscillation circuit 53 and then applies it between the drive electrode 11 and each one of the first and second electrode plates 9, 10. Thus, the ultrasonic motor 1 is controlled in such a manner that the actual vibrational frequency fn of the stator 2 substantially coincides with the resonance frequency f1, and the ultrasonic motor 1 is rotated forward by the complex vibrations mainly composed of the secondary torsional vibrations.

On the other hand, when the ultrasonic motor 1 is rotated backward, the switch 51 is switched to the second switch terminal 51b. At the startup of the ultrasonic motor 1 immediately after turning on the ultrasonic motor 1, the voltage signal generation circuit 52 generates the voltage signal V2x (=V2xa) based on the fact that the voltage signal V2s is zero and then outputs it to the frequency variable oscillation circuit 53.

Then, the frequency variable oscillation circuit 53 generates the voltage signal V2f having the frequency equal to the resonance frequency f2 based on the voltage signal V2x (=V2xa) outputted from the voltage signal generation circuit 52. The voltage signal V2f is boosted through the transformer 54 and is then applied between the drive electrode 11 and each one of the first and second electrodes 9, 10. Thereafter, the rotor 3, which is urged against the top surface of the metal block 5, is rotated backward in the counter-clockwise direction (CCW) in FIG. 7A by the complex vibrations mainly composed of the primary longitudinal vibrations.

Once the ultrasonic motor 1 starts to rotate backward due to the vibrations of the stator 2, the voltage signal V2s is generated in the first and second piezoelectric drive elements 6, 7 that are vibrated along with the stator 2. The voltage signal V2s is inputted to the voltage signal generation circuit 52. The voltage signal generation circuit 52 generates the voltage signal V2x for driving the stator 2 based on the voltage signal V2s outputted from the longitudinal-vibration sensing electrode 12 in such a manner that the actual vibrational frequency fn of the stator 2 substantially coincides with the resonance frequency f2. Then, the voltage signal generation circuit 52 outputs the generated voltage signal V2x to the frequency variable oscillation circuit 53.

The frequency variable oscillation circuit 53 generates the voltage signal V2f having the frequency f2x based on the voltage signal V2x outputted from the voltage signal generation circuit 52 in such a manner that the actual vibrational frequency fn of the stator 2 substantially coincides with the resonance frequency f2. Then, the frequency variable oscillation circuit 53 outputs the generated voltage signal V2f to the transformer 54.

Thereafter, the transformer 54 boosts the voltage signal V2f outputted from the frequency variable oscillation circuit 53 and then applies it between the drive electrode 11 and each one of the first and second electrode plates 9, 10. Thus, the ultrasonic motor 1 is controlled in such a manner that the actual vibrational frequency fn of the stator 2 substantially coincides with the resonance frequency f2, and the ultrasonic motor 1 is rotated backward by the complex vibrations mainly composed of the primary longitudinal vibrations.

Characteristics of the ultrasonic motor 1 will be described.

(1) In the present embodiment, the stator 2 has the torsional-vibration sensing piezoelectric element 8 and the torsional-vibration sensing electrode plate 14.

Thus, the forward rotational control of the ultrasonic motor 1 can be carried out based on the voltage signals outputted from the torsional-vibration sensing piezoelectric element 8 and the torsional-vibration sensing electrode plate 14. As a result, the forward rotational control of the ultrasonic motor 1 that rotates forward due to the complex vibrations mainly composed of the secondary torsional vibrations can be carried out with higher accuracy in comparison to the previously proposed ultrasonic motor that is rotated through the forward rotational control based on the voltage signals outputted from the longitudinal-vibration sensing means.

(2) In the present embodiment, the torsional-vibration sensing piezoelectric element 8 and the torsional-vibration sensing electrode plate 14 are arranged adjacent to the second metal block 5 of the stator 2 where relatively large strains are generated due to the torsional vibrations (or approximately at a point where a wave peak or wave trough is observed during the torsional vibrations, e.g., approximately at a vertical axial center of the graph depicted with "(a)" in FIG. 8).

Thus, the torsional-vibrational signals can be more accurately sensed with the torsional-vibration sensing piezoelectric element 8 and the torsional-vibration sensing electrode plate 14. As a result, it is possible to provide the optimum operating conditions for the ultrasonic motor 1.

(3) In the present embodiment, the stator 2 has the torsional-vibration sensing piezoelectric element 8 and the torsional-vibration sensing electrode plate 14. Furthermore, the stator 2 has the third electrode plate 13 that includes the longitudinal-vibration sensing electrode 12 and that is clamped between the first piezoelectric drive element 6 and the second piezoelectric drive element 7.

As a result, the voltage signal V1s indicative of the vibrational state of the ultrasonic motor 1 during the forward rotation thereof and the voltage signal V2s indicative of the vibrational state of the ultrasonic motor 1 during the backward rotation thereof are sensed with the torsional-vibration sensing electrode plate 14 and the longitudinal-vibration sensing electrode 12, respectively. Vibrations of the ultrasonic motor 1 during the forward rotation thereof and the backward rotation thereof are controlled by the self-excited oscillation drive circuit 50 based on the sensed voltage signals V1s and V2s, respectively. Thus, the ultrasonic motor 1 according to the present embodiment can be controlled more accurately in comparison to the previously proposed ultrasonic motor in which the vibrational states during the forward rotation and the backward rotation are sensed only with the longitudinal-vibration sensing electrode. As a result, the rather complex vibration comparator circuit and frequency control circuit that are required in the previously proposed ultrasonic motor are no longer required according to the present embodiment, so that the number of the components and the manufacturing cost of the ultrasonic motor 1 can be reduced.

(4) In the present embodiment, the voltage signal V1s from the torsional-vibration sensing electrode plate 14 and the voltage signal V2s from the longitudinal-vibration sensing electrode 12 are sensed. Then, the drive voltage signal V1f (or V2f) for driving the stator 2 is generated in the self-excited oscillation drive circuit 50 in such a manner that the actual vibrational frequency fn of the stator 2 substantially coincides with the resonance frequency f1 (or f2). Thereafter, the generated drive voltage signal V1f (or V2f) is applied between the drive electrode 11 and each one of the first and second electrode plates 9, 10.

Thus, the ultrasonic motor 1 can be operated under the optimum operating conditions that make the actual vibrational frequency fn of the stator 2 to substantially coincide with or approximate to the resonance frequency f1 (or f2). As a result, the rather complex frequency comparator circuit and frequency control circuit that are required in the previously proposed ultrasonic motor to provide the optimum operating conditions are no longer required. In this way, the drive circuit of the ultrasonic motor 1 is simplified, and thus the number of the components and the manufacturing cost of the ultrasonic motor 1 can be reduced.

(5) In accordance with the present embodiment, the self-excited oscillation drive circuit 50 includes the voltage signal generation circuit 52. The voltage signal generation circuit 52 generates the voltage signal V1x (or V2x) for driving the stator 2 based on the voltage signal V1s from the torsional-vibration sensing electrode plate 14 or the voltage signal V2s from the longitudinal-vibration sensing electrode 12 in such a manner that the actual vibrational frequency fn of the stator 2 substantially coincides with the resonance frequency f1 (or f2). Thus, the vibrational states of the ultrasonic motor 1 during the forward rotation thereof and the backward rotation thereof can be more accurately sensed, so that it is possible to provide the optimum operating conditions for the ultrasonic motor 1.

The above embodiment can be modified as follows.

Figure 9:
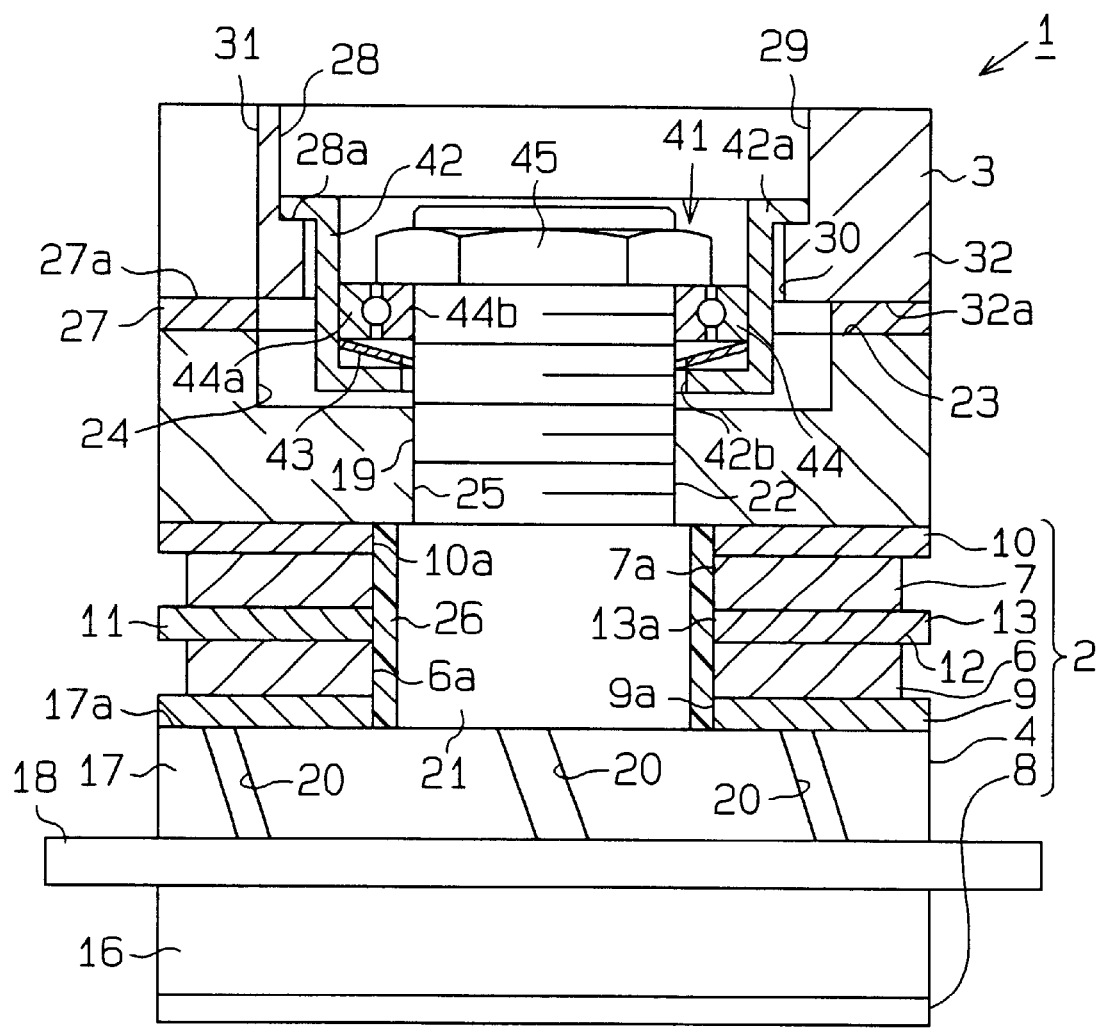
FIG. 9 is a schematic longitudinal-cross sectional view showing a modification of the ultrasonic motor.

As shown in FIG. 9, the torsional-vibration sensing piezoelectric element 8 may be secured to a bottom surface of the first block portion 16. In this arrangement, the torsional vibration sensing piezoelectric element 8 may be directly connected to the first switch terminal 51a of the switch 51 of the self-excited oscillation drive circuit 50 through a lead wire (not shown). In this case, besides the advantages described in the above sections (1), (3)–(5), the torsional-vibration sensing electrode plate 14 and the dielectric plate 15 can be advantageously eliminated. As a result, the number of the components and the manufacturing cost of the ultrasonic motor 1 can be further reduced.

Figure 10:
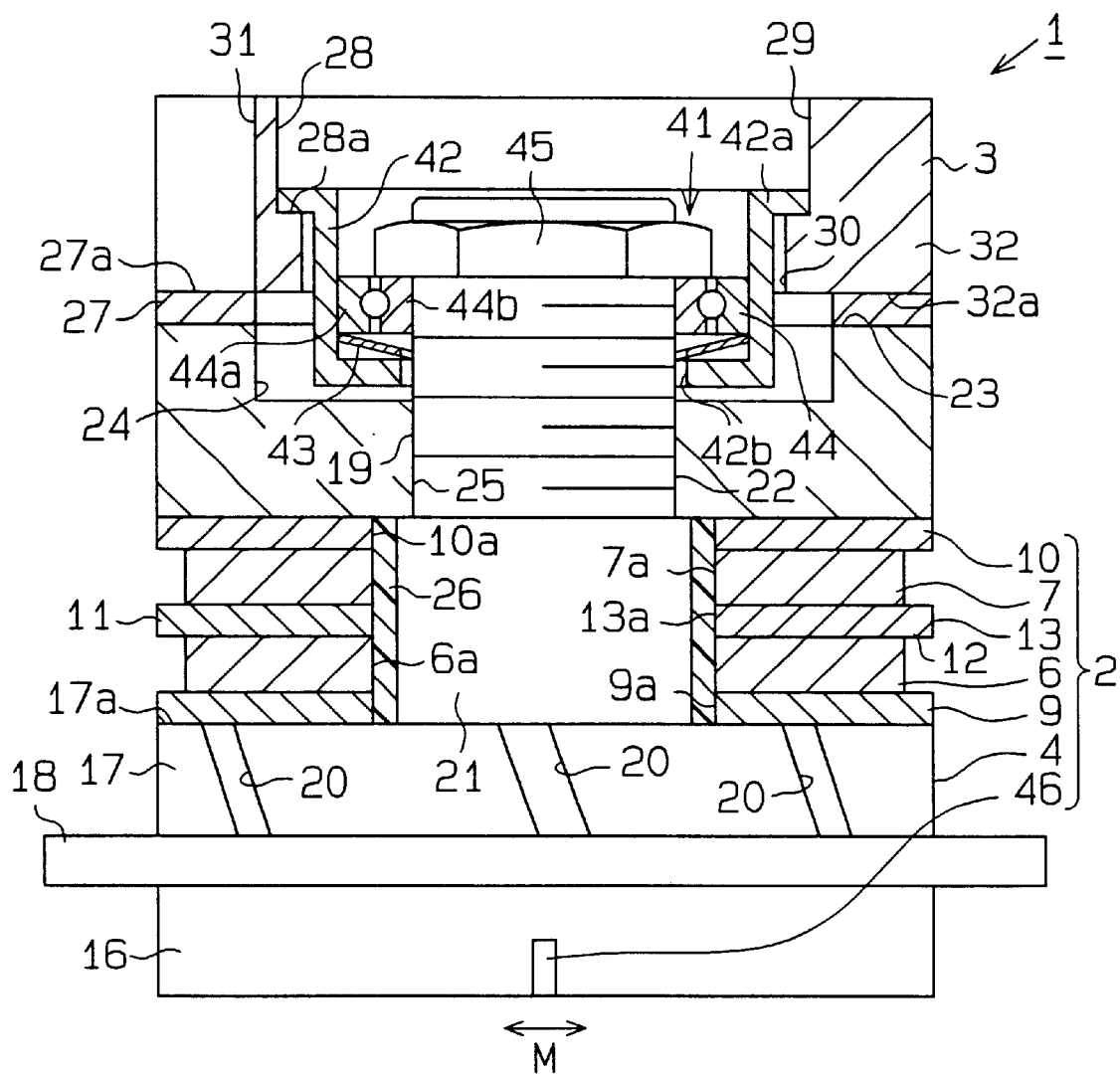
FIG. 10 is a schematic longitudinal cross-sectional view showing another modification of the ultrasonic motor.

Furthermore, as shown in FIG. 10, a torsional-vibration sensing piezoelectric element 46 that is polarized in a thickness direction thereof (direction M in FIG. 10) may be secured to a peripheral surface of the first block 16 (approximately at a point where a wave trough or wave peak is observed during the torsional vibrations, e.g., approximately at a vertical axial bottom of the graph depicted with "(a)" in FIG. 8). In this arrangement, the torsional vibration sensing piezoelectric element 46 may be directly connected to the first switch terminal 51a of the switch 51 of the self-excited oscillation drive circuit 50 through a lead wire (not shown). In this case, besides the advantages described in the above sections (1), (3)–(5), the torsional-vibration sensing electrode plate 14 and the dielectric plate 15 can be advantageously eliminated. As a result, the number of the components and the manufacturing cost of the ultrasonic motor 1 can be further reduced.

Figure 11:
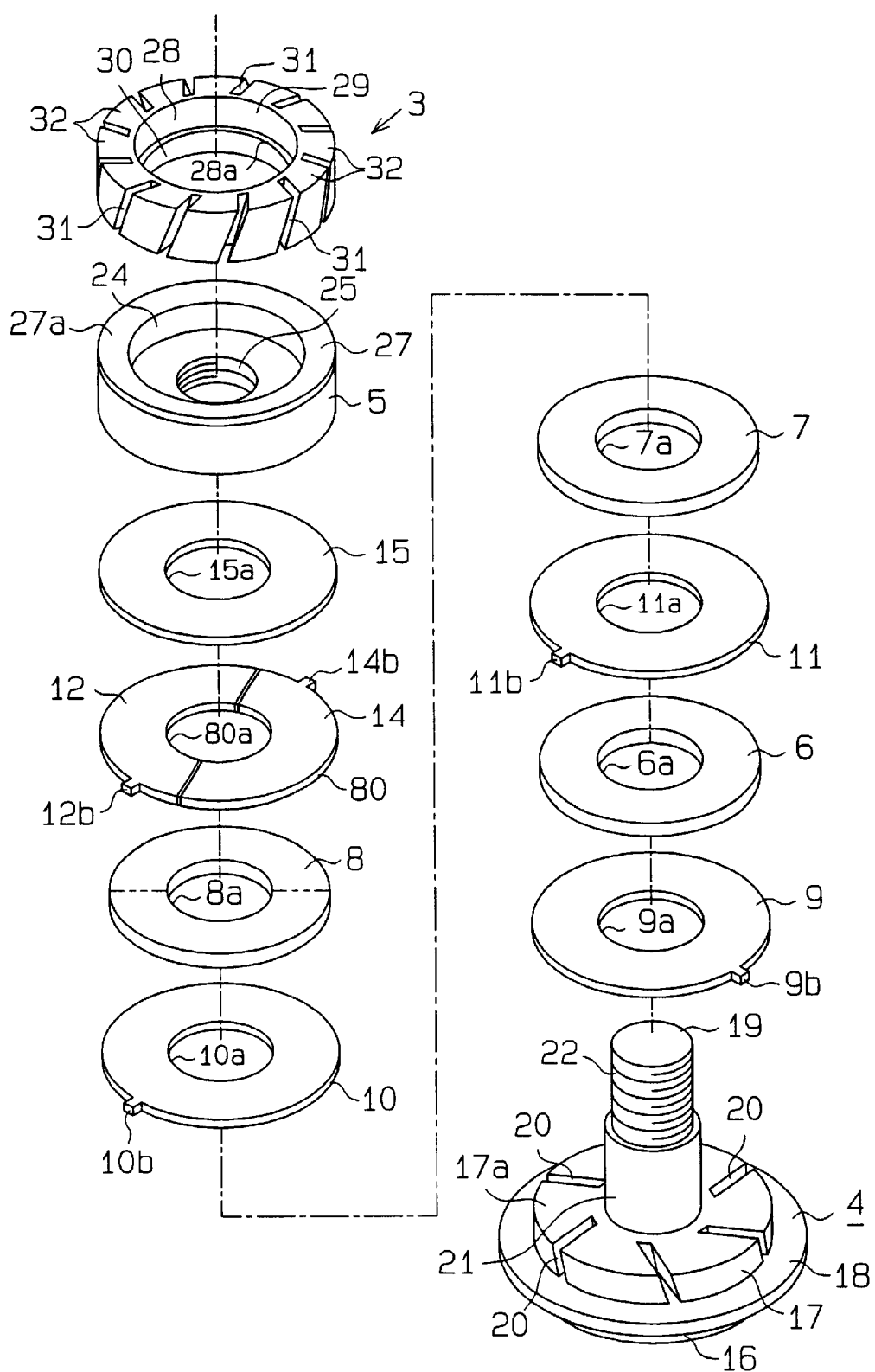
FIG. 11 is an exploded perspective view showing a further modification of the ultrasonic motor.
Figure 12:
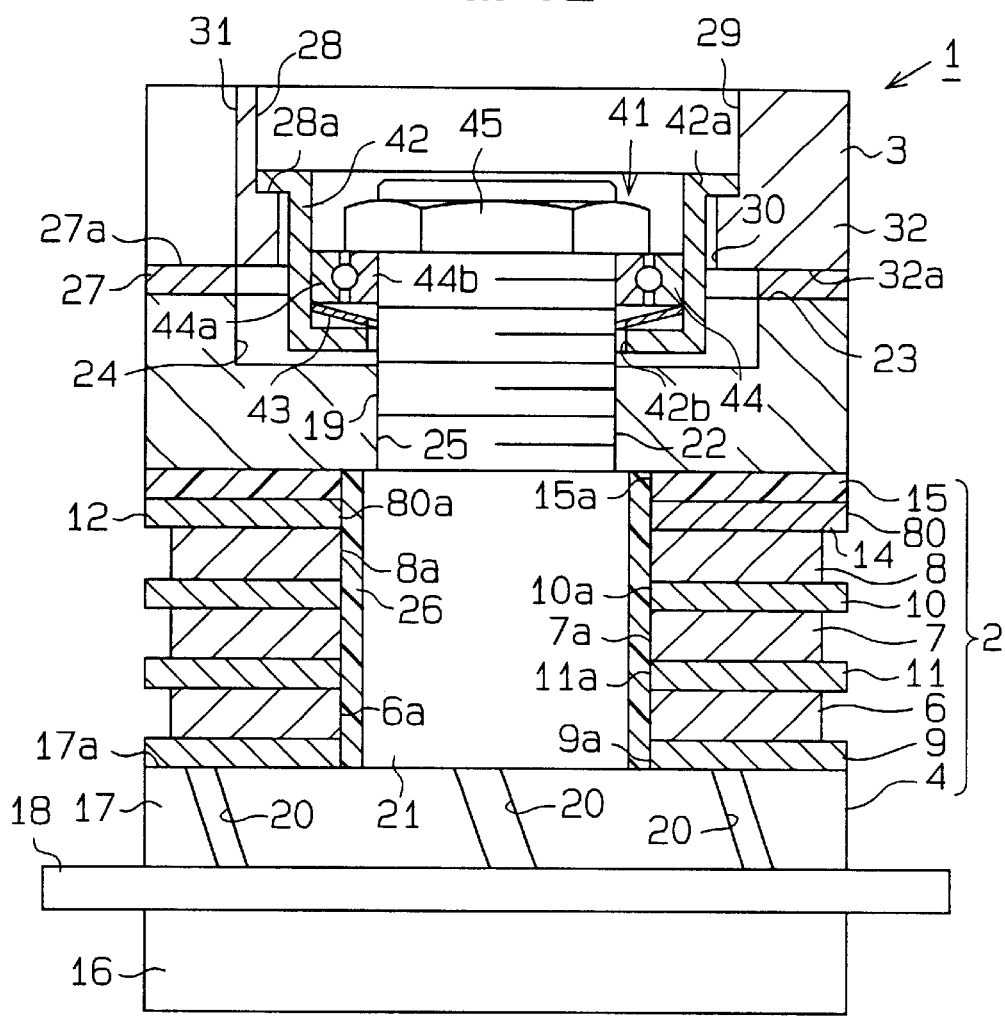
FIG. 12 is a longitudinal cross-sectional view showing a further modification of the ultrasonic motor.

Furthermore, as shown in FIGS. 11 and 12, the electrode 11 may have only the drive electrode, and the longitudinal-vibration sensing electrode 12 and the torsional-vibration sensing electrode 14 may be integrated into a one-piece body while electrically insulating therebetween. In this arrangement, a through hole 80a is provided to penetrate through a center of an electrode plate 80 that includes both the longitudinal-vibration sensing electrode 12 and the torsional-vibration sensing electrode 14, which are integrated into a one-piece body and are electrically insulated from each other.

A terminal piece 14b electrically connected to the torsional-vibration sensing electrode 14 as well as a terminal piece 12b electrically connected to the longitudinal-vibration sensing electrode 12 are provided in an outer peripheral surface of the electrode plate 80. The terminal piece 14b and the terminal piece 12b are connected to the self-excited oscillation drive circuit 50 through lead wires.

Figure 13:
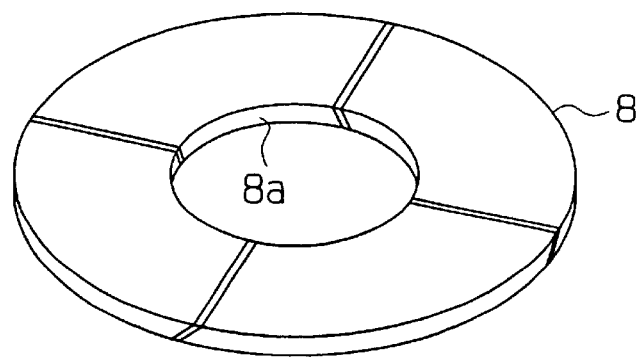
FIG. 13 is a perspective view showing a modification of a torsional-vibration sensing piezoelectric element of the ultrasonic motor.

Also, one half of the torsional vibration sensing piezoelectric element 8 may be polarized in a thickness direction thereof (or the axial direction of the ultrasonic motor), and the other half of the torsional-vibration sensing piezoelectric element 8 may be polarized in a circumferential direction (torsional direction about the rotational axis of the ultrasonic motor). That is, a portion of the torsional-vibration sensing piezoelectric element 8 can be used as a longitudinal-vibration sensing piezoelectric element that acts as the longitudinal-vibration sensing means. Alternatively, as shown in FIG. 13, the torsional-vibration sensing piezoelectric element 8 may be polarized in a direction oblique to the axial direction of the ultrasonic motor. In both of the above cases, both the longitudinal and torsional strains can be sensed with the single torsional-vibration sensing piezoelectric element 8. Thus, besides the advantages described in the above sections (1)–(5) of the first embodiment, the first and second piezoelectric drive elements 6, 7 can be more effectively used.

Figure 14:
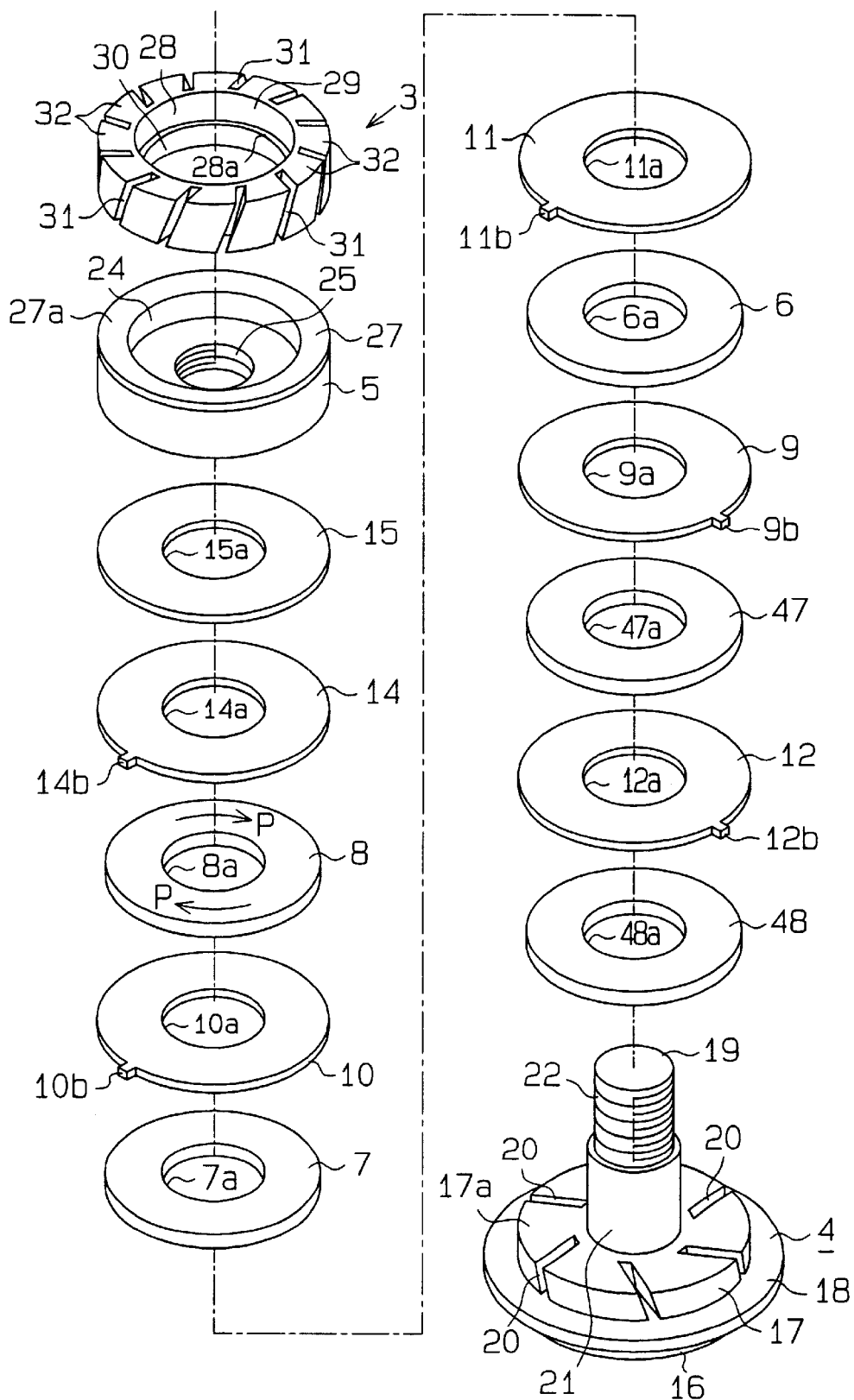
FIG. 14 is an exploded perspective view showing a further modification of the ultrasonic motor.

The stator 2 of the above-described embodiment can be modified as shown in FIG. 14. Specifically, as shown in FIG. 14, the stator 2 includes the first and second metal blocks 4, 5, the first and second piezoelectric drive elements 6, 7, the torsional-vibration sensing piezoelectric element 8, the first and second electrode plates 9, 10, the drive electrode 11, the longitudinal-vibration sensing electrode 12, the torsional-vibration sensing electrode plate 14, a longitudinal-vibration sensing piezoelectric element 47, and dielectric plates 15, 48. The torsional-vibration sensing piezoelectric element 8 constitutes the torsional-vibration sensing means. The first and second electrode plates 9, 10 act as power supply electrode plates. The longitudinal-vibration sensing electrode 12 constitutes the longitudinal-vibration sensing means. The torsional-vibration sensing electrode plate 14 constitutes the torsional-vibration sensing means. The longitudinal-vibration sensing piezoelectric element 47 constitutes the longitudinal-vibration sensing means.

The drive electrode 11 is disk shaped and has a through hole 11a penetrating through its center. A terminal piece 11b is formed in an outer peripheral surface of the drive electrode 11. The terminal piece 11b is connected to the self-excited oscillation drive circuit 50 through a lead wire.

The longitudinal-vibration sensing electrode 12 is disk shaped and has a through hole 12a penetrating through its center. A terminal piece 12b is formed in an outer peripheral surface of the longitudinal vibration-sensing electrode 12. The terminal piece 12b is connected to the self-excited oscillation drive circuit 50 through a lead wire.

The torsional-vibration sensing electrode plate 14 is disk shaped and has a through hole 14a penetrating through its center. A terminal piece 14b is formed in an outer peripheral surface of the torsional-vibration sensing electrode plate 14. The terminal piece 14b is connected to the self-excited oscillation drive circuit 50 through a lead wire.

The longitudinal-vibration sensing piezoelectric element 47 is disk shaped and has a through hole 47a penetrating through its center. The longitudinal-vibration sensing piezoelectric element 47 is polarized in a thickness direction or the axial direction of the ultrasonic motor (vertical direction in FIG. 14).

The dielectric plate 48 is disk shaped and is made of a dielectric material, such as a resin material. The dielectric plate 48 has a through hole 48a that penetrates through its center.

The first and second piezoelectric drive elements 6, 7, the torsional-vibration sensing piezoelectric element 8, the longitudinal-vibration sensing piezoelectric element 47, the first and second electrode plates 9, 10, the drive electrode 11, the torsional-vibration sensing electrode plate 14, the longitudinal vibration sensing electrode 12 and the dielectric plates 15, 48 are arranged between the first metal block 4 and the second metal block 5. More specifically, the dielectric plate 48, the longitudinal-vibration sensing electrode 12, the longitudinal-vibration sensing piezoelectric element 47, the first electrode plate 9, the first piezoelectric drive element 6, the drive electrode 11, the second piezoelectric drive element 7, the second electrode plate 10, the torsional-vibration sensing piezoelectric element 8, the torsional-vibration sensing electrode plate 14 and the dielectric plate 15 are stacked in this order between the top surface of the first metal block 4 and the bottom surface of the second metal block 5.

In this arrangement, advantages similar to those described in the above sections (1)–(5) can be achieved.

Figure 15:
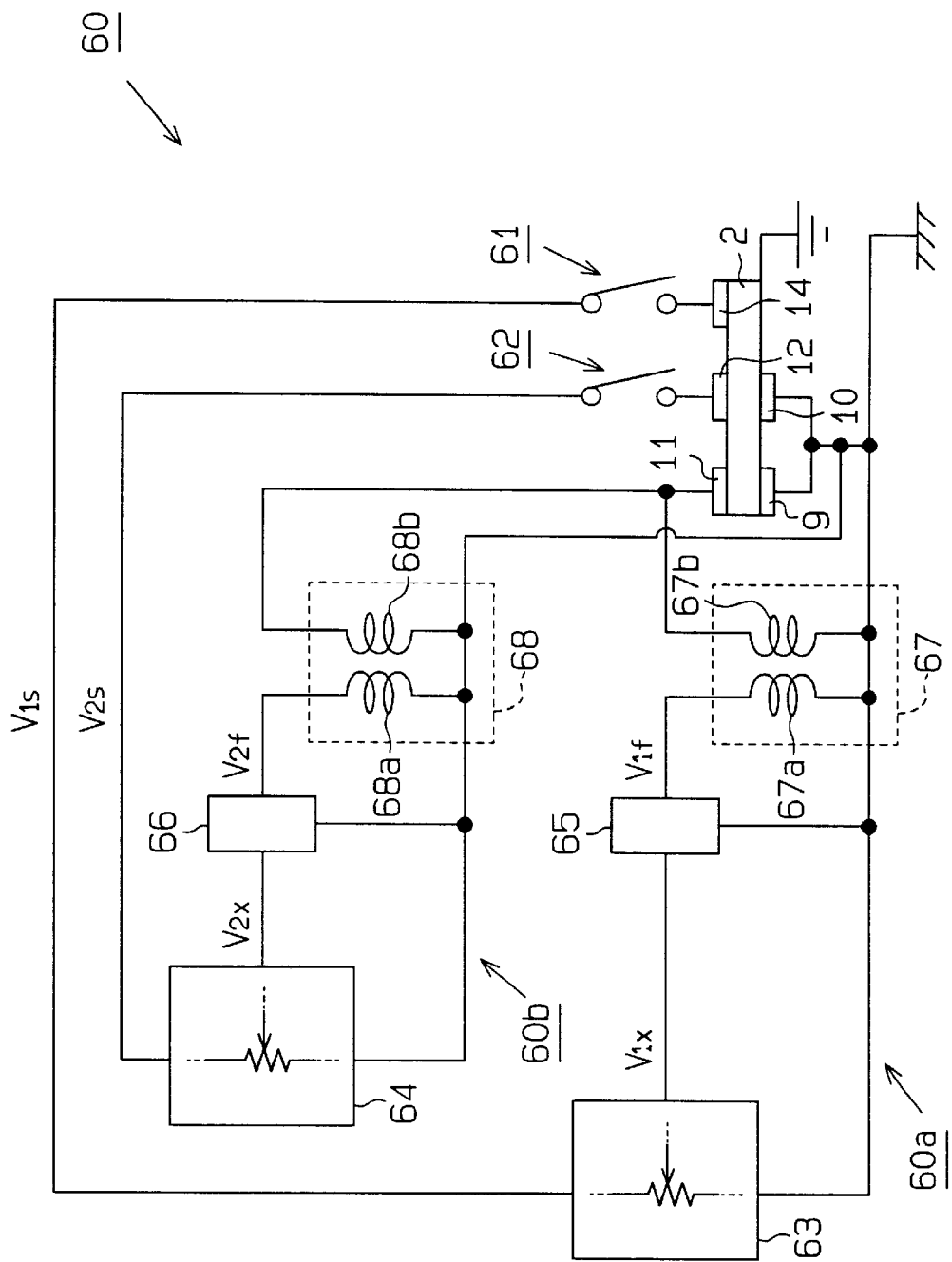
FIG. 15 is a circuit diagram showing a modification of the drive circuit for driving the ultrasonic motor.
Figure 16:
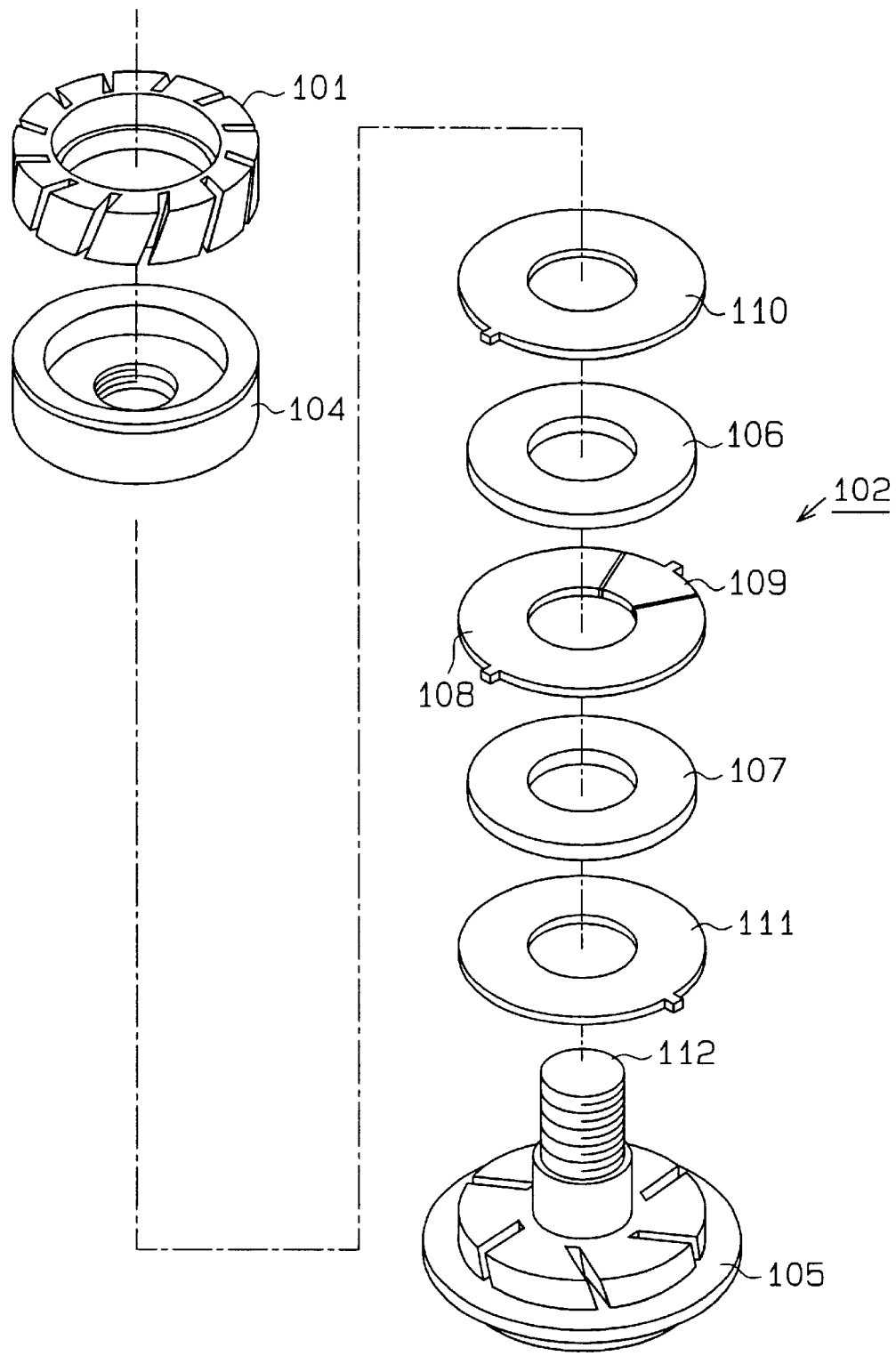
FIG. 16 is an exploded perspective view of a previously proposed ultrasonic motor.
Figure 17:
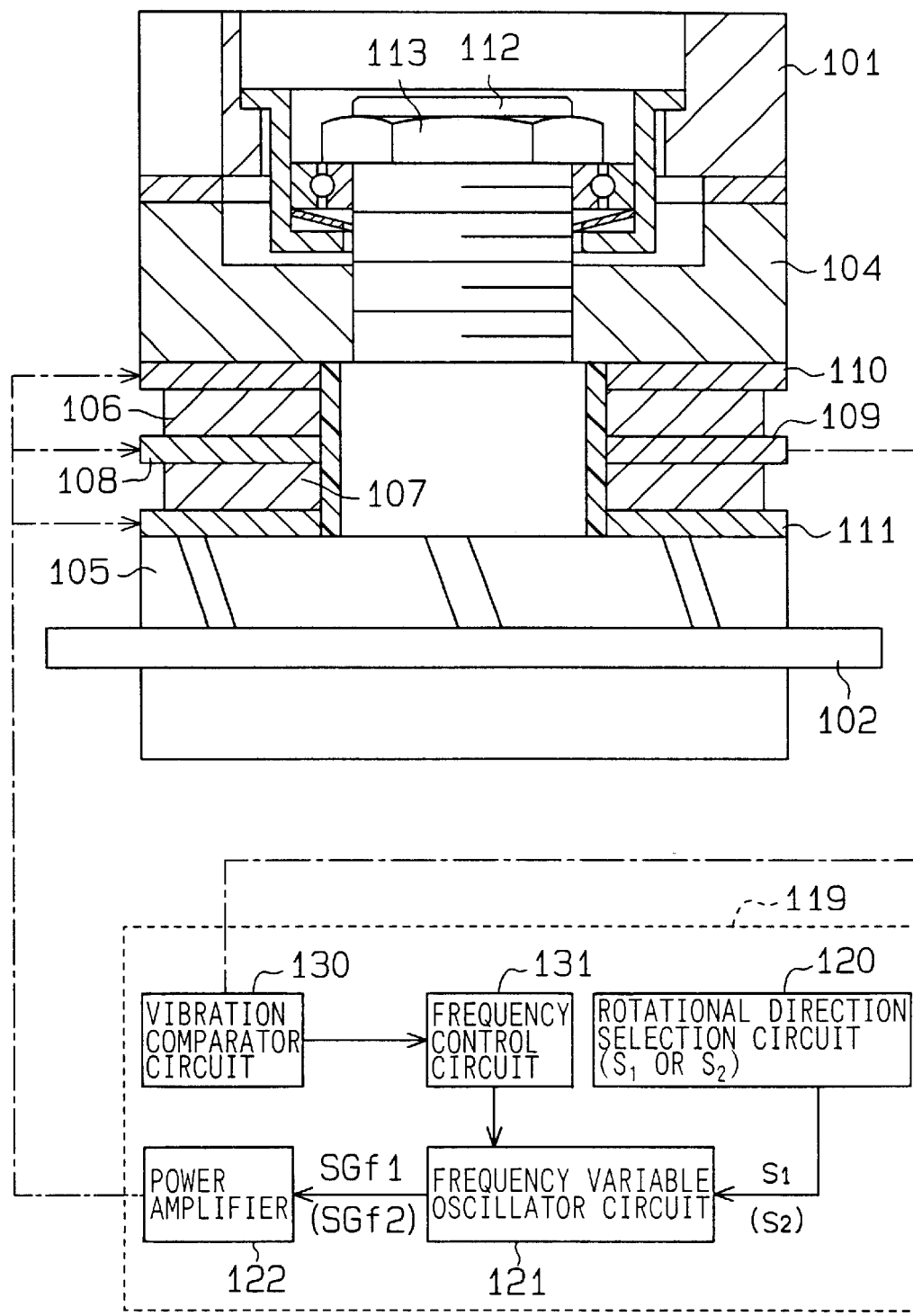
FIG. 17 is a schematic view showing the previously proposed ultrasonic motor and a drive circuit for driving the motor.

Furthermore, the self-excited oscillation drive circuit of the above-described embodiment can be a self-excited oscillation drive circuit 60 shown in FIG. 15. More specifically, the self-excited oscillation drive circuit 60 includes a first drive means 60a and a second drive means 60b, as shown in FIG. 15. The first drive means 60a includes a switch 61, a first voltage generation circuit 63, a first frequency variable oscillation circuit 65 and a first transformer 67. The second drive means 60b includes a switch 62, a second voltage signal generation circuit 64, a second frequency variable oscillation circuit 66 and a second transformer 68.

The switch 61 is connected to the torsional-vibration sensing electrode plate 14, and the switch 62 is connected to the longitudinal-vibration sensing electrode 12. The switch 61 is turned on when the ultrasonic motor 1 is rotated forward. Furthermore, the switch 61 is turned off when the ultrasonic motor 1 is rotated backward. On the other hand, the switch 62 is turned off when the ultrasonic motor 1 is rotated forward. Furthermore, the switch 62 is turned on when the ultrasonic motor 1 is rotated backward.

When the ultrasonic motor 1 is rotated forward, a voltage signal V1s generated in the torsional-vibration sensing electrode plate 14 is outputted to the first voltage generation circuit 63 through the switch 61. When the ultrasonic motor 1 is rotated backward, a voltage signal V2s generated in the longitudinal-vibration sensing electrode 12 is outputted to the second voltage signal generation circuit 64 through the switch 62.

An output terminal of the first voltage signal generation circuit 63 is connected to the first frequency variable oscillation circuit 65. The first voltage signal generation circuit 63 generates a variable voltage signal V1x based on the voltage signal V1s from the torsional vibration sensing electrode 14 and outputs it to the first frequency variable oscillation circuit 65. At the startup of the ultrasonic motor 1 immediately after turning on the ultrasonic motor 1, more specifically, when the voltage signal V1s is zero after turning on the ultrasonic motor 1, the first voltage signal generation circuit 63 generates the voltage signal V1ax and outputs it to the first frequency variable osecilator circuit 65.

Similarly, an output terminal of the second voltage signal generation circuit 64 is connected to the second frequency variable oscillation circuit 66. The second voltage signal generation circuit 64 generates the variable voltage signal V2x based on the voltage signal V2s from the longitudinal vibration sensing electrode 12 and outputs it to the second frequency variable oscillation circuit 66. At the startup of the ultrasonic motor 1 immediately after turning on the ultrasonic motor 1, more specifically, when the voltage signal V2s is zero after turning on the ultrasonic motor 1, the second voltage signal generation circuit 64 generates the voltage signal V2ax and outputs it to the second frequency variable osecilator circuit 66.

Input terminals of the first and second frequency variable oscillation circuits 65, 66 are connected to the first and second voltage generation circuits 63, 64, respectively. Output terminals of the first and second frequency variable oscillation circuits 65, 66 are connected to the primary windings 67a, 68a of the first and second transformers 67, 68, respectively.

The first frequency variable oscillation circuit 65 generates the voltage signal V1f as a torsional-vibration drive voltage signal having a variable frequency f1x based on the voltage signal V1x outputted from the first voltage signal generation circuit 63. Then, the first frequency variable oscillation circuit 65 outputs the voltage signal V1f to the first transformer 67. Similarly, the second frequency variable oscillation circuit 66 generates the voltage signal V2f as a longitudinal-vibration drive voltage signal having a variable frequency f2x based on the voltage signal V2x outputted from the second voltage signal generation circuit 64. Then, the second frequency variable oscillation circuit 66 outputs the voltage signal V2f to the second transformer 68.

When the first frequency variable oscillation circuit 65 receives the voltage signal V1x equal to "V1xa" from the first voltage signal generation circuit 63, it outputs the voltage signal V1f having the frequency f1x equal to "f1". When the second frequency variable oscillation circuit 66 receives the voltage signal V2x equal to "V2xa" from the second voltage signal generation circuit 64, it outputs the voltage signal V2f having the frequency f2x equal to "f2". The frequency f1 is the resonance frequency of the stator 2 during the forward rotation of the ultrasonic motor 1, and the frequency f2 is the resonance frequency of the stator 2 during the backward rotation of the ultrasonic motor 1.

The primary windings 67a, 68a of the first and second transformers 67, 68 are connected to the first and second frequency variable oscillation circuits 65, 66, respectively. Secondary windings 67b, 68b of the first and second transformers 67, 68 are both connected to the drive electrode 11 and also to the first and second electrodes 9, 10, respectively. The first and second transformers 67, 68 boost the voltage signals V1f, V2f outputted from the first and second frequency variable oscillation circuits 65, 66, respectively.

Then, the first and second transformers 67, 68 apply the boosted voltage signals V1f, V2f between the drive electrode 11 and each one of the first and second electrode plates 9, 10.

In this arrangement, besides the advantages disclosed in the above sections (1)–(5), controls of the forward rotation and the backward rotation of the ultrasonic motor 1 can be separately conducted due to the fact the first drive means 60a for generating the torsional-vibration drive voltage signal is separated from the second drive means 60b for generating the longitudinal-vibration drive voltage signal, so that reliability of the operation control of the ultrasonic motor 1 can be improved.

The self-excited oscillation drive circuit 60 can be modified to have only one transformer. That is, the first and second transformers 67, 68 are integrated into a single transformer, and the voltage signals V1f, V2f outputted from the first and second frequency variable oscillation circuits 65, 66 can be boosted with the single transformer. Then, the boosted voltage signals V1f, V2f are applied between the drive electrode 11 and each one of the first and second electrode plates 9, 10.

In the above embodiment, the present invention is applied to the ultrasonic motor 1 that rotates both forward and backward. However, the present invention can be equally applicable to an ultrasonic motor that rotates only forward. In this case, the longitudinal-vibration sensing electrode 12 can be eliminated. In this arrangement, advantages similar to those described in the above sections (1) and (2) can be achieved.

Additional advantages and modifications will readily occur to those skilled in the art. The invention in its broader terms is therefore, not limited to the specific details, representative apparatus, and illustrative examples shown and described.

What is claimed is:

1. An ultrasonic motor comprising:

a rotor; and a stator generating complex vibrations for rotating said rotor, said complex vibrations including longitudinal vibrations and torsional vibrations, said rotor being rotatably urged against said stator, said stator including:

a plurality of piezoelectric drive elements;

a plurality of power supply electrode plates for supplying power to said piezoelectric drive elements;

a longitudinal-vibration sensing means for sensing said longitudinal vibrations;

a first metal block;

a second metal block, said piezoelectric drive elements, said power supply electrode plates and said longitudinal-vibration sensing means being securely clamped between said first metal block and said second metal block; and a torsional-vibration sensing means for sensing said torsional vibrations, said torsional-vibration sensing means being provided separately from said piezoelectric drive elements and said power supply electrode plates, wherein said torsional-vibration sensing means includes a torsional-vibration sensing piezoelectric element;

each one of said piezoelectric drive elements is polarized in an axial direction of said ultrasonic motor; and said torsional-vibration sensing piezoelectric element is polarized in a torsional direction about a rotational axis of said ultrasonic motor.

2. An ultrasonic motor according to claim 1, wherein:

said ultrasonic motor is controlled by a drive circuit;

said drive circuit generates a torsional-vibration drive voltage signal based on a sensed signal sensed through said torsional-vibration sensing means and drives said stator with said torsional-vibration drive voltage signal; and said drive circuit generates a longitudinal vibration-drive voltage signal based on a sensed signal sensed through said longitudinal-vibration sensing means and drives said stator with said longitudinal-vibration drive voltage signal.

3. An ultrasonic motor according to claim 1, wherein said ultrasonic motor is controlled by a drive circuit, said drive circuit including:

a first drive means that generates a torsional-vibration drive voltage signal based on a sensed signal sensed through said torsional-vibration sensing means and that drives said stator with said torsional-vibration drive voltage signal; and a second drive means that generates a longitudinal vibration-drive voltage signal based on a sensed signal sensed through said longitudinal-vibration sensing means and that drives said stator with said longitudinal-vibration drive voltage signal.

4. An ultrasonic motor according to claim 1, wherein said longitudinal-vibration sensing means includes a longitudinal-vibration sensing piezoelectric element and a longitudinal-vibration sensing electrode plate, said longitudinal-vibration sensing piezoelectric element being provided separately from said piezoelectric drive elements.

5. An ultrasonic motor according to claim 1, wherein said torsional-vibration sensing means further includes a torsional-vibration sensing electrode plate.

6. An ultrasonic motor according to claim 1, wherein said torsional-vibration sensing means is generally arranged approximately at a position where one of a wave peak and a wave trough is observed during said torsional vibrations in said stator.

7. An ultrasonic motor according to claim 1, wherein said torsional-vibration sensing means is arranged adjacent to one of said piezoelectric drive elements.

8. An ultrasonic motor according to claim 1, wherein said plurality of piezoelectric drive elements generate vibrations to rotate said rotor.

9. An ultrasonic motor according to claim 1, wherein said means for sensing said longitudinal vibrations comprises said plurality of piezoelectric drive elements.

10. An ultrasonic motor comprising:

a rotor; and a stator generating complex vibrations for rotating said rotor, said complex vibrations including longitudinal vibrations and torsional vibrations, said rotor being rotatably urged against said stator, said stator including:

a plurality of piezoelectric drive elements;

a plurality of power supply electrode plates for supplying power to said piezoelectric drive elements;

a longitudinal-vibration sensing means for sensing said longitudinal vibrations;

a first metal block;

a second metal block, said piezoelectric drive elements, said power supply electrode plates and said longitudinal-vibration sensing means being securely clamped between said first metal block and said second metal block; and a torsional-vibration sensing means for sensing said torsional vibrations, said torsional-vibration sensing means being provided separately from said piezoelectric drive elements and said power supply electrode plates, wherein:
said torsional-vibration sensing means includes a torsional-vibration sensing piezoelectric element;
said longitudinal-vibration sensing means includes a longitudinal-vibration sensing piezoelectric element; and
said longitudinal-vibration sensing piezoelectric element and said torsional-vibration sensing piezoelectric element are integrated into a one-piece body and are electrically insulated from each other, said longitudinal-vibration sensing piezoelectric element being polarized in an axial direction of said ultrasonic motor, said torsional-vibration sensing piezoelectric element being polarized in a torsional direction about a rotational axis of said ultrasonic motor.

11. An ultrasonic motor comprising:
a rotor; and
a stator generating complex vibrations for rotating said rotor, said complex vibrations including longitudinal vibrations and torsional vibrations, said rotor being rotatably urged against said stator, said stator including:
a plurality of piezoelectric drive elements;
a plurality of power supply electrode plates for supplying power to said piezoelectric drive elements;
a longitudinal-vibration sensing means for sensing said longitudinal vibrations;
a first metal block;
a second metal block, said piezoelectric drive elements, said power supply electrode plates and said longitudinal-vibration sensing means being securely clamped between said first metal block and said second metal block; and
a torsional-vibration sensing means for sensing said torsional vibrations, said torsional-vibration sensing means being provided separately from said piezoelectric drive elements and said power supply electrode plates, wherein:
said torsional-vibration sensing means includes a torsional-vibration sensing piezoelectric element and a torsional-vibration sensing electrode plate;
said longitudinal-vibration sensing means includes a longitudinal-vibration sensing piezoelectric element and a longitudinal-vibration sensing electrode plate;
said longitudinal-vibration sensing piezoelectric element and said torsional-vibration sensing piezoelectric element are integrated into a one-piece body and are electrically insulated from each other, said longitudinal-vibration sensing piezoelectric element being polarized in an axial direction of said ultrasonic motor, said torsional-vibration sensing piezoelectric element being polarized in a torsional direction about a rotational axis of said ultrasonic motor; and
said longitudinal-vibration sensing electrode plate and said torsional-vibration sensing electrode plate are integrated into a one-piece body.

12. A method for operating an ultrasonic motor including a rotor and a stator, said stator generating complex vibrations for rotating said rotor, said complex vibrations including longitudinal vibrations and torsional vibrations, said stator including a plurality of piezoelectric drive elements, a plurality of power supply electrode plates for supplying power to said piezoelectric drive elements, a longitudinal-vibration sensing means for sensing said longitudinal vibrations, a first metal block and a second metal block, said piezoelectric drive elements, said power supply electrode plates and said longitudinal-vibration sensing means being securely clamped between said first metal block and said second metal block, said rotor being rotatably urged against said stator, said method comprising steps of:
sensing voltage signals through said longitudinal-vibration sensing means and also through a torsional-vibration sensing means provided in said stator for sensing said torsional vibrations, wherein:
said torsional-vibration sensing means includes a torsional-vibration sensing piezoelectric element;
each one of said piezoelectric drive elements is polarized in an axial direction of said ultrasonic motor; and
said torsional-vibration sensing piezoelectric element is polarized in a torsional direction about a rotational axis of said ultrasonic motor;
generating a drive voltage signal for driving said stator based on said voltage signal in such a manner that an actual vibrational frequency of said stator substantially coincides with a resonance frequency of said stator; and
applying said drive voltage signal to said power supply electrode plates.

13. A method according to claim 12, wherein:
said drive voltage signal is generated by a drive circuit, said drive circuit including a first drive means and a second drive means, said first drive means including a first voltage signal generation circuit and a first frequency variable oscillation circuit, said second drive means including a second voltage signal generation circuit and a second frequency variable oscillation circuit;
said step of generating said drive voltage signal further includes steps of:
generating a torsional drive voltage signal through said first voltage signal generation circuit and said first frequency variable oscillation circuit based on said voltage signal sensed through said torsional-vibration sensing means; and
generating a longitudinal drive voltage signal through said second voltage signal generation circuit and said second frequency variable oscillation circuit based on said voltage signal sensed through said longitudinal-vibration sensing means; and
said step of applying said drive voltage signal further includes a step of applying one of said torsional drive voltage signal and said longitudinal drive voltage signal to said power supply electrode plates.

14. A stator for an ultrasonic motor comprising:
a plurality of piezoelectric rotor drive elements for generating longitudinal and torsional vibrations;
a plurality of power supply electrode plates for supplying power to said piezoelectric rotor drive elements;
a longitudinal-vibration sensor for sensing said longitudinal vibrations;
first and second metal blocks between which said piezoelectric drive elements, said power supply electrode plates and said longitudinal-vibration sensor are secured; and
a torsional-vibration sensor provided separately from said piezoelectric drive elements and said power supply electrode plates for sensing said torsional vibrations, wherein:

said torsional-vibration sensor includes a torsional-vibration sensing piezoelectric element, and said longitudinal-vibration sensor includes a longitudinal-vibration sensing piezoelectric element; and said longitudinal-vibration sensing piezoelectric element and said torsional-vibration sensing piezoelectric element are stacked into a one-piece body and are electrically insulated from each other, said longitudinal-vibration sensing piezoelectric element being polarized in an axial direction of said ultrasonic motor, said torsional-vibration sensing piezoelectric element being polarized in a torsional direction about a motor rotational axis.

* * * * *